(12) United States Patent
Arakawa et al.

(10) Patent No.: US 10,658,950 B2
(45) Date of Patent: May 19, 2020

(54) PIEZOELECTRIC ACTUATOR, PIEZOELECTRIC MOTOR, ROBOT, AND ELECTRONIC COMPONENT CONVEYANCE APPARATUS

(71) Applicant: Seiko Epson Corporation, Tokyo (JP)

(72) Inventors: Yutaka Arakawa, Hara (JP); Tomoaki Takahashi, Matsumoto (JP); Noboru Furuya, Chino (JP); Yuichiro Tsuyuki, Matsumoto (JP)

(73) Assignee: Seiko Epson Corporation (JP)

( * ) Notice: Subject to any disclaimer, the term of this patent is extended or adjusted under 35 U.S.C. 154(b) by 310 days.

(21) Appl. No.: 15/661,306

(22) Filed: Jul. 27, 2017

(65) Prior Publication Data

US 2018/0034387 A1    Feb. 1, 2018

(30) Foreign Application Priority Data

Jul. 28, 2016 (JP) ................. 2016-148976

(51) Int. Cl.
| | |
|---|---|
| *H02N 2/00* | (2006.01) |
| *H02N 2/10* | (2006.01) |
| *B25J 9/12* | (2006.01) |
| *B65G 47/90* | (2006.01) |

(52) U.S. Cl.
CPC ............... *H02N 2/001* (2013.01); *B25J 9/12* (2013.01); *B65G 47/901* (2013.01); *H02N 2/0065* (2013.01); *H02N 2/103* (2013.01)

(58) Field of Classification Search
CPC ...... H02N 2/002; H02N 2/0065; H02N 2/103; H02N 2/004

USPC .................................. 310/323.01–323.21
See application file for complete search history.

(56) References Cited

U.S. PATENT DOCUMENTS

| | | | |
|---|---|---|---|
| 6,856,072 B2 | 2/2005 | Kosaka et al. | |
| 2008/0093953 A1* | 4/2008 | Koc ................. | H01L 41/0913 310/323.02 |
| 2009/0167111 A1* | 7/2009 | Mori ................. | H02N 2/0015 310/323.16 |
| 2010/0181870 A1* | 7/2010 | Nagaoka ............ | H01L 41/0906 310/323.16 |
| 2013/0140951 A1 | 6/2013 | Kamijo et al. | |
| 2013/0230196 A1 | 9/2013 | Negishi et al. | |

FOREIGN PATENT DOCUMENTS

| | | |
|---|---|---|
| JP | 2002-058266 A | 2/2002 |
| JP | 2005-073341 A | 3/2005 |
| JP | 2008-312336 A | 12/2008 |
| JP | 2011-155761 A | 8/2011 |

(Continued)

*Primary Examiner* — Derek J Rosenau
(74) *Attorney, Agent, or Firm* — Harness, Dickey & Pierce, P.L.C.

(57) ABSTRACT

A piezoelectric actuator includes a vibrating plate having a piezoelectric material, and a contact part provided in an end portion of the vibrating plate in contact with a driven part, wherein the contact part has a first portion in contact with the driven part and a second portion provided between the first portion and the vibrating plate and having lower rigidity than the first portion. Further, a width of the second portion in a direction crossing an arrangement direction of the first portion and the second portion is smaller than a width of the first portion in the crossing direction.

15 Claims, 18 Drawing Sheets

(56) References Cited

FOREIGN PATENT DOCUMENTS

| JP | 2012-210049 A | 10/2012 |
| JP | 2013-121213 A | 6/2013 |
| WO | WO-2012-063823 A1 | 5/2012 |

\* cited by examiner

PIEZOELECTRIC ACTUATOR, PIEZOELECTRIC MOTOR, ROBOT, AND ELECTRONIC COMPONENT CONVEYANCE APPARATUS

BACKGROUND

1. Technical Field

The present invention relates to a piezoelectric actuator, piezoelectric motor, robot, and electronic component conveyance apparatus.

2. Related Art

In related art, piezoelectric actuators including piezoelectric elements are known (e.g. see Patent Document 1 (JP-A-2011-155761)). The piezoelectric actuator described in Patent Document 1 includes a piezoelectric actuator main body and a contact part provided in an end portion of the piezoelectric actuator main body, and the contact part is adapted to be in contact with a non-driver. Further, the contact part has fixed outer shape and cross-sectional area in the axis direction thereof so that the shape and area of the contact surface with the non-driver may not change even when the contact part wears down.

However, in the piezoelectric actuator described in Patent Document 1, the cross-sectional area of the base portion of the contact part is larger than the cross-sectional area of the tip end portion and rigidity of the base portion is higher than rigidity of the tip end portion. Accordingly, efficient transmission of the vibration of the piezoelectric actuator to the contact part is harder and the amplitude of the contact part is smaller. In other words, it may be impossible to bring the vibration trajectory of the tip end portion of the contact part closer to an ideal state.

SUMMARY

An advantage of some aspects of the invention is to provide a piezoelectric actuator in which decrease of an amplitude of a contact part may be reduced, and provide a piezoelectric motor, robot, and electronic component conveyance apparatus including the piezoelectric actuator.

The advantage can be achieved by the following configuration.

A piezoelectric actuator according to an aspect of the invention includes a vibrating plate having a piezoelectric material, and a contact part provided in an end portion of the vibrating plate in contact with a driven part, wherein the contact part has a first portion in contact with the driven part and a second portion provided between the first portion and the vibrating plate and having lower rigidity than the first portion.

With this configuration, the piezoelectric actuator in which decrease of the amplitude of the contact part may be reduced may be provided.

In the piezoelectric actuator according to the aspect of the invention, it is preferable that a width of the second portion in a direction crossing an arrangement direction of the first portion and the second portion is smaller than a width of the first portion in the crossing direction.

With this configuration, the rigidity of the second portion may be made lower than the rigidity of the first portion by the simple configuration.

In the piezoelectric actuator according to the aspect of the invention, it is preferable that the second portion connects a center part of the first portion in the crossing direction and the vibrating plate.

With this configuration, the shape of the contact part is relatively simple and, for example, the manufacture of the contact part is easier.

In the piezoelectric actuator according to the aspect of the invention, it is preferable that the second portion has at least two divided pieces provided apart in the crossing direction.

With this configuration, the rigidity of the second portion may be made lower than the rigidity of the first portion by the simple configuration.

In the piezoelectric actuator according to the aspect of the invention, it is preferable that one of the divided pieces connects one end part of the first portion in the crossing direction and the vibrating plate, and the other of the divided pieces connects the other end part of the first portion in the crossing direction and the vibrating plate.

With this configuration, the shape of the contact part is relatively simple and, for example, the manufacture of the contact part is easier.

In the piezoelectric actuator according to the aspect of the invention, it is preferable that the vibrating plate has a concave portion, and an end part of the second portion on the vibrating plate side is inserted into the concave portion.

With this configuration, the end part of the second portion is reinforced by the vibrating plate and the contact part is harder to break.

In the piezoelectric actuator according to the aspect of the invention, it is preferable that the contact part has a third portion located between the first portion and the second portion and having a width in a direction crossing an arrangement direction of the first portion and the second portion gradually decreasing from the first portion side toward the second portion side.

With this configuration, the rigidity may be gradually changed from the first portion to the second portion, and stress concentration on a boundary part between the first portion and the second portion may be reduced. Accordingly, the contact part is harder to break.

In the piezoelectric actuator according to the aspect of the invention, it is preferable that the first portion and the second portion are formed using different materials.

With this configuration, the rigidity of the second portion may be easily made lower than the rigidity of the first portion.

In the piezoelectric actuator according to the aspect of the invention, it is preferable that the second portion contains a resin.

With this configuration, the second portion with lower rigidity may be obtained relatively easily.

A piezoelectric motor according to an aspect of the invention includes the piezoelectric actuator according to the aspect of the invention.

With this configuration, the piezoelectric motor with higher reliability may be obtained.

A robot according to an aspect of the invention includes the piezoelectric actuator according to the aspect of the invention.

With this configuration, the robot with higher reliability may be obtained.

An electronic component conveyance apparatus according to an aspect of the invention includes the piezoelectric actuator according to the aspect of the invention.

With this configuration, the electronic component conveyance apparatus with higher reliability may be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a piezoelectric actuator, piezoelectric motor, robot, and electronic component conveyance apparatus according to the invention will be explained in detail based on embodiments shown in the accompanying drawings.

First Embodiment

First, a piezoelectric motor according to the first embodiment of the invention will be explained.

Figure 1:
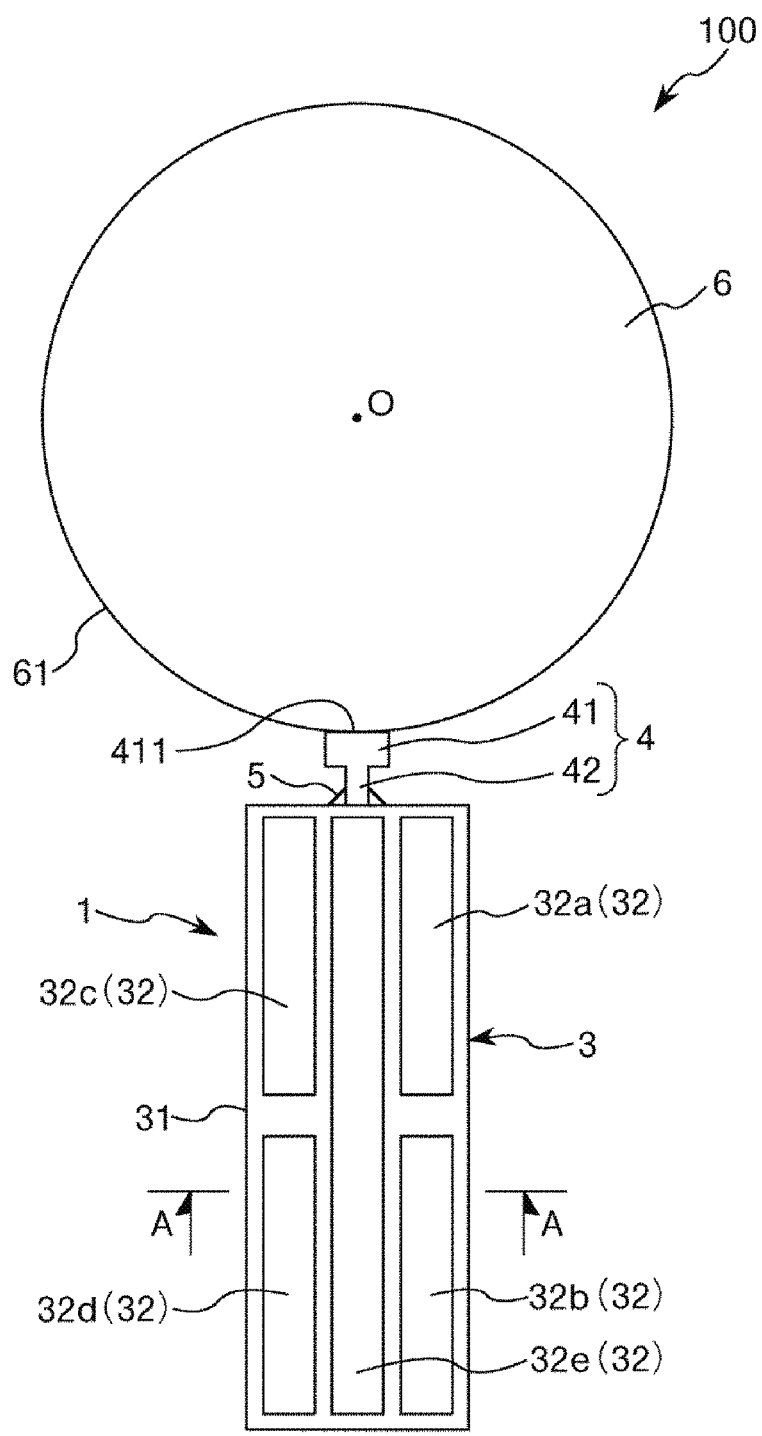
FIG. 1 is a schematic view showing an overall configuration of a piezoelectric motor according to the first embodiment of the invention.
Figure 2:
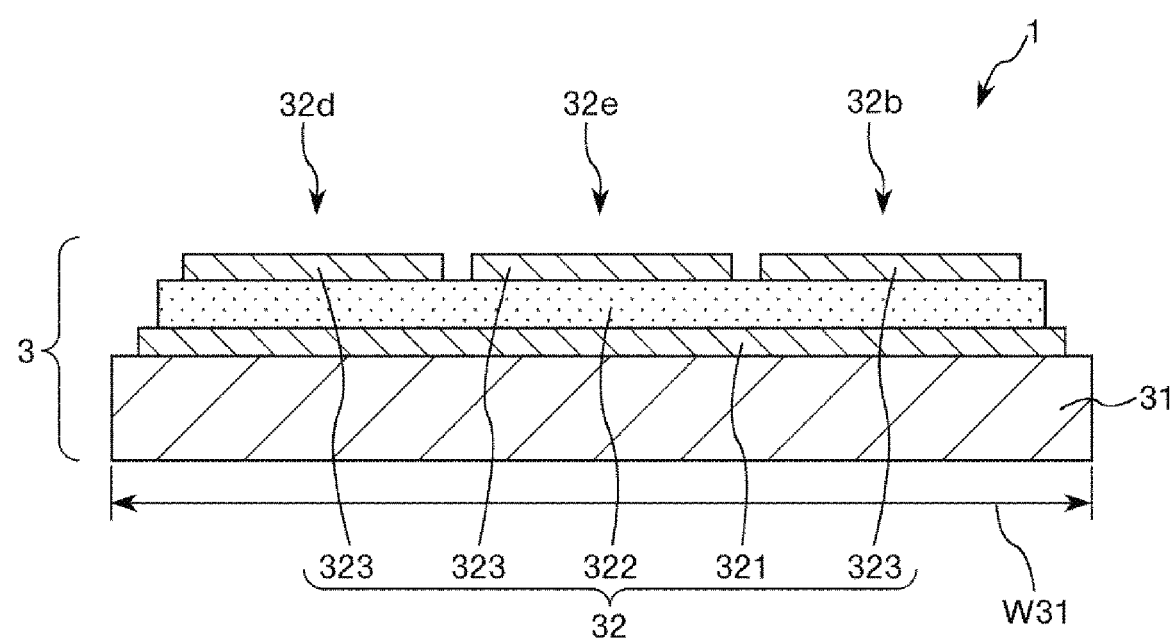
FIG. 2 is a sectional view of a piezoelectric actuator of the piezoelectric motor shown in FIG. 1 (a sectional view along A-A in FIG. 1).
Figure 3:
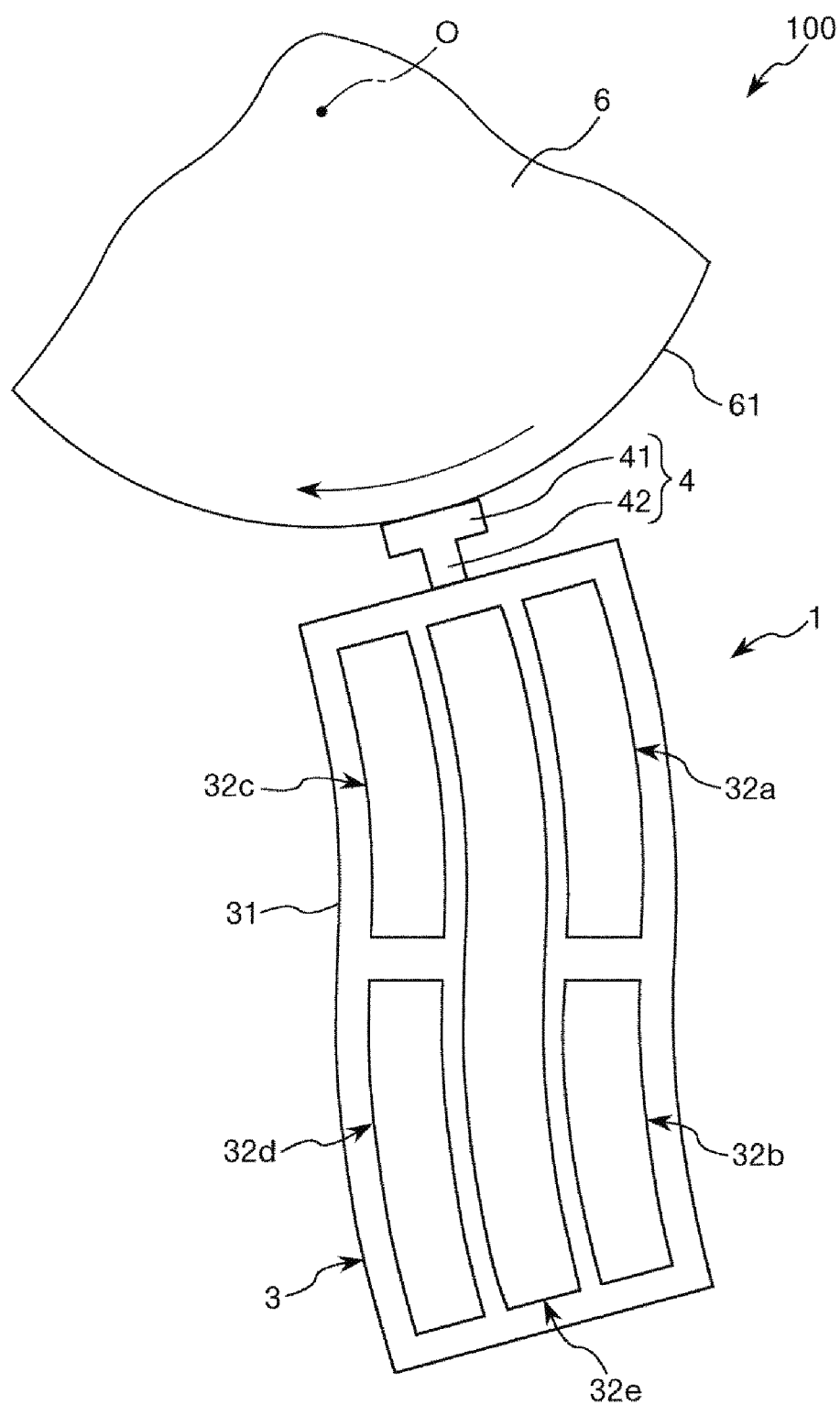
FIG. 3 is a schematic view for explanation of driving of the piezoelectric motor shown in FIG. 1.
Figure 4:
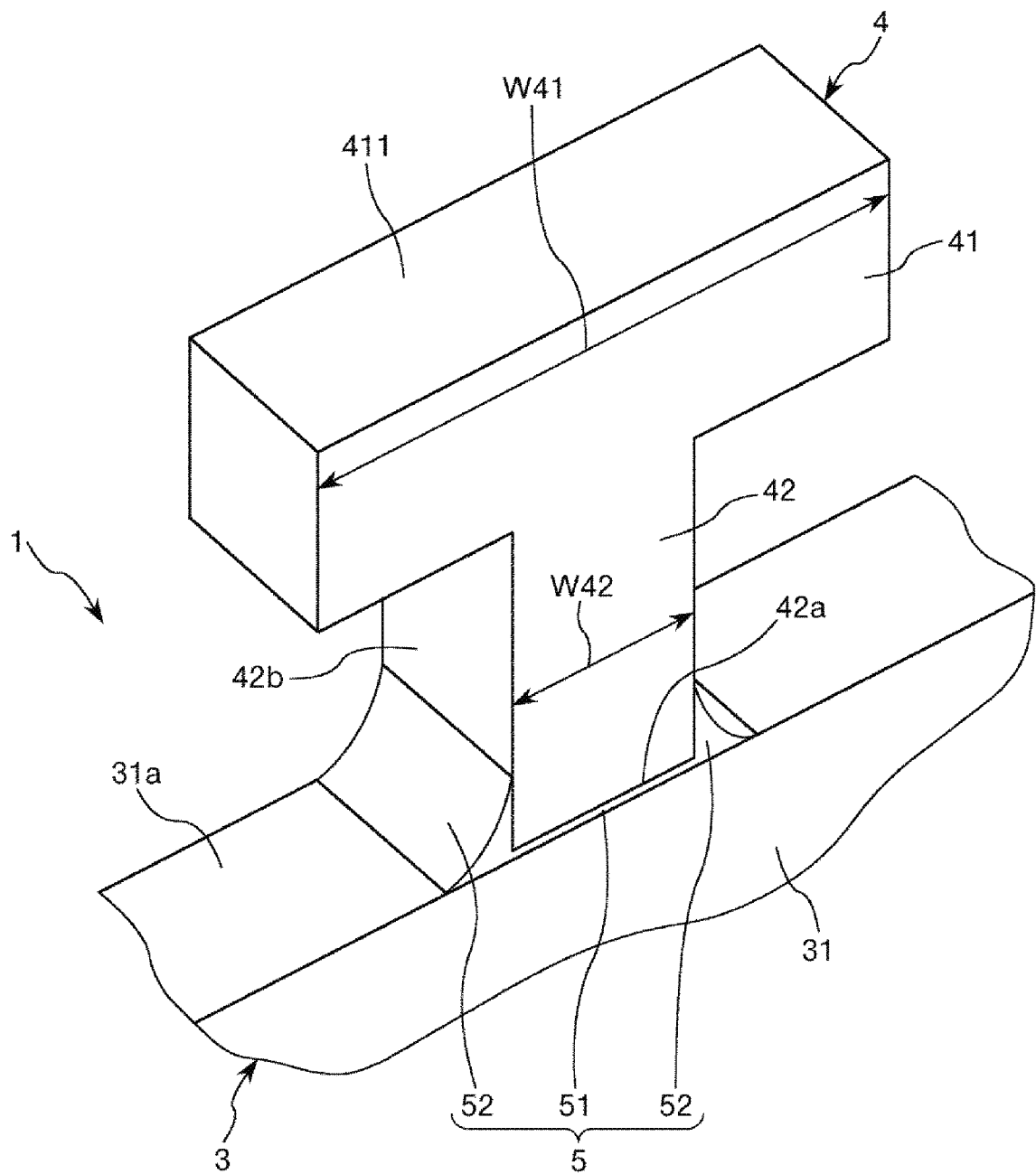
FIG. 4 is a partially enlarged perspective view of a contact part of the piezoelectric actuator shown in FIG. 1.

FIG. 1 is a schematic view showing an overall configuration of the piezoelectric motor according to the first embodiment of the invention. FIG. 2 is a sectional view of a piezoelectric actuator of the piezoelectric motor shown in FIG. 1 (a sectional view along A-A in FIG. 1). FIG. 3 is a schematic view for explanation of driving of the piezoelectric motor shown in FIG. 1. FIG. 4 is a partially enlarged perspective view of a contact part of the piezoelectric actuator shown in FIG. 1.

The piezoelectric motor 100 (ultrasonic motor) shown in FIG. 1 includes a rotor 6 as a driven part (following part) rotatable about a rotation shaft O, and a piezoelectric actuator 1 in contact with an outer circumferential surface 61 of the rotor 6. In the piezoelectric motor 100, the piezoelectric actuator 1 is driven (vibrated), and thereby, the rotor 6 may be rotated about the rotation shaft O. The piezoelectric motor 100 includes the piezoelectric actuator 1, and thereby, may enjoy advantages of the piezoelectric actuator 1, which will be described later, and may exert good reliability. Note that the configuration of the piezoelectric motor 100 is not limited to the configuration in FIG. 1. For example, in the embodiment, the rotor 6 that rotationally moves is used as the driven part driven by the piezoelectric actuator 1, however, e.g. a member that linearly moves may be used as the driven part, not limited to that.

The piezoelectric actuator 1 has a vibrating plate 3 having a piezoelectric material 322, and a contact part 4 provided in an end portion of the vibrating plate 3 in contact with the rotor 6 as the driven part for transmitting drive power. The contact part 4 has a tip end portion 41 as a first portion in contact with (abutting against) the rotor 6, and a base end portion 42 as a second portion provided between the tip end portion 41 and the vibrating plate 3 and having lower rigidity than the tip end portion 41. According to the configuration, the base end portion 42 is relatively soft (because the rigidity of the base end portion 42 is lower than that of the tip end portion 41), and the vibration of the vibrating plate 3 generated by expansion and contraction of the piezoelectric material 322 is easier to transmit to the tip end portion 41 via the base end portion 42. Accordingly, the amplitude of the tip end portion 41 may be made larger (the decrease of the amplitude may be reduced), and the vibration trajectory of the tip end portion 41 may be brought closer to an ideal vibration trajectory (ideal amplitude). Further, the tip end portion 41 is made relatively hard, and wear due to friction with the rotor 6 may be reduced. Accordingly, temporal changes (deterioration) of vibration characteristics may be reduced. As below, the piezoelectric actuator 1 will be explained in detail.

The vibrating plate 3 has a reinforcing plate 31 (shim) having a nearly rectangular shape in a plan view as seen from the thickness direction of the vibrating plate 3 (hereinafter, simply referred to as "plan view"), and a plurality of piezoelectric elements 32 provided on one surface of the reinforcing plate 31. Further, the contact part 4 is provided to project from the reinforcing plate 31 in the tip end portion of the reinforcing plate 31 in the longitudinal direction (the end portion on the rotor 6 side) in the center part in the width direction (lateral direction).

As the reinforcing plate 31, e.g. a silicon board may be used. Further, an insulating layer (not shown) is provided on the surface of the reinforcing plate 31. For example, when the silicon board is used as the reinforcing plate 31, the insulating layer may be formed using silicon oxide formed by thermal oxidation of the surface of the silicon board.

The plurality of piezoelectric elements 32 include five piezoelectric elements 32a, 32b, 32c, 32d, 32e. The piezoelectric element 32e is provided along the longitudinal direction of the reinforcing plate 31 in the center part in the width direction of the reinforcing plate 31. With respect to the piezoelectric element 32e, on one side in the width direction of the reinforcing plate 31, the piezoelectric elements 32a, 32b are provided along the longitudinal direction of the reinforcing plate 31 and, on the other side, the piezoelectric elements 32c, 32d are provided along the longitudinal direction of the reinforcing plate 31.

As shown in FIG. 2, the five piezoelectric elements 32a, 32b, 32c, 32d, 32e arranged as described above respectively have a first electrode 321 provided on the reinforcing plate 31, a piezoelectric material 322 provided on the first electrode 321, and second electrodes 323 provided on the piezoelectric material 322.

The first electrode 321 is a common electrode provided in common with the piezoelectric elements 32a, 32b, 32c, 32d, 32e. On the other hand, the second electrodes 323 are individual electrodes individually provided with respect to each of the piezoelectric elements 32a, 32b, 32c, 32d, 32e. Further, the piezoelectric material 322 is integrally provided in common with the piezoelectric elements 32a, 32b, 32c, 32d, 32e. Note that the piezoelectric material 322 may be individually provided with respect to each of the piezoelectric elements 32a, 32b, 32c, 32d, 32e. Or, contrary to the embodiment, the first electrodes 321 may be individually provided with respect to each of the piezoelectric elements 32a, 32b, 32c, 32d, 32e and the second electrode 323 may be provided in common with the piezoelectric elements 32a, 32b, 32c, 32d, 32e.

As the constituent materials of the first electrode 321 and the second electrodes 323, not particularly limited to, but e.g. a metal material such as aluminum (Al), nickel (Ni), gold (Au), platinum (Pt), iridium (Ir), or copper (Cu) is used. Further, the first electrode 321 and the second electrodes 323 may be respectively formed by evaporation, sputtering, or the like.

The piezoelectric material 322 expands and contracts in a direction along the longitudinal direction of the reinforcing plate 31 by application of an electric field in the directions along the thickness direction of the reinforcing plate 31. As the constituent material of the piezoelectric material 322, e.g. piezoelectric ceramics such as lead zirconate titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, or lead scandium niobate may be used. The piezoelectric material 322 of the piezoelectric ceramics may be formed from a balk material or formed using a sol-gel method, for example. As the constituent material of the piezoelectric material 322, polyvinylidene fluoride, quartz crystal, or the like may be used in addition to the above described piezoelectric ceramics.

An example of operation of the above described piezoelectric actuator 1 is explained. Note that the operation method of the piezoelectric actuator 1 is not limited to the following method. For example, when drive signals at predetermined frequencies (alternating voltages) are applied to the respective piezoelectric elements 32a, 32b, 32c, 32d, 32e so that the phase difference between the piezoelectric elements 32a, 32d and the piezoelectric elements 32b, 32c may be 30° and the phase difference between the piezoelectric elements 32a, 32d and the piezoelectric element 32e may be 180°, as shown in FIG. 3, the piezoelectric elements 32a, 32b, 32c, 32d, 32e respectively expand and contract and the reinforcing plate 31 flexurally deforms in an S-shape in the in-plane direction thereof (expansively and contractively deforms in the longitudinal directions and flexurally deforms in the width directions) and the tip end of the contact part 4 makes an elliptic motion. As a result, the rotor 6 rotates in an arrow direction about the rotation shaft O thereof. In this regard, the drive signals are applied to the piezoelectric elements 32b, 32c so that the phase difference from the piezoelectric elements 32a, 32d may be 210°, and thereby, the rotor 6 may be reversely rotated.

Contact Part

Next, the contact part 4 as a part that transmits drive power in contact with the rotor 6 of the piezoelectric actuator 1 is explained in detail. The contact part 4 is one end portion of the reinforcing plate 31 in the longitudinal direction (the end portion on the rotor 6 side) placed in the center part in the width direction and provided to project from the reinforcing plate 31. Further, the contact part 4 is joined to the reinforcing plate 31 using an adhesive 5. Furthermore, the contact part 4 has the tip end portion 41 in contact with the outer circumferential surface 61 of the rotor 6 and the base end portion 42 provided closer to the vibrating plate 3 side than the tip end portion 41 and having lower rigidity than the tip end portion 41. According to the configuration, as described above, the base end portion 42 is relatively soft and the vibration of the vibrating plate 3 generated by the expansion and contraction of the piezoelectric material 322 is easily transmitted to the tip end portion 41 via the base end portion 42. Accordingly, the amplitude of the tip end portion 41 may be made larger and the vibration trajectory of the tip end portion 41 may be brought closer to an ideal vibration trajectory. In addition, the tip end portion 41 is made relatively hard and wear due to friction with the rotor may be reduced. Accordingly, temporal changes (deterioration) of vibration characteristics may be reduced and more stably driving of the rotor 6 may be realized.

As shown in FIG. 4, the tip end portion 41 has a longitudinal shape extending, in a plan view of the vibrating plate 3 (in a plan view as seen from the thickness direction of the vibrating plate 3) in the width direction of the vibrating plate 3 (in the plan view of the vibrating plate 3, a direction orthogonal to the projection direction of the contact part 4 from the reinforcing plate 31), and a tip end surface 411 thereof serves as a contact surface with the rotor 6. Further, the tip end surface 411 is formed by a flat surface. Note that, while the tip end surface 411 is the flat surface, the outer circumferential surface 61 of the rotor 6 is a curved surface, however, the tip end surface 411 comes into surface contact with the outer circumferential surface 61 in the entire area because the contact part 4 is sufficiently smaller for the rotor 6.

As described above, the tip end portion 41 has the longitudinal shape extending in the width direction of the vibrating plate 3, and thereby, the area of the tip end surface 411 may be made wider and the contact area between the tip end surface 411 and the rotor 6 may be made wider. Accordingly, the resistance to friction with the rotor 6 may be improved. Further, the tip end portion 41 has fixed sectional shape and sectional area along the longitudinal direction of the vibrating plate 3 (projection direction of the contact part 4). Thereby, even when the tip end portion 41 wears due to friction with the rotor 6, the shape and area of the tip end surface 411 do not substantially change from the initial condition. Accordingly, variations in friction force with the rotor 6 may be prevented. Therefore, the rotor 6 may be stably driven for a long period.

The tip end surface 411 is formed by the flat surface, however, the shape of the tip end surface 411 is not limited to that. For example, the tip end surface 411 may be a concave curved surface corresponding to the curve of the outer circumferential surface 61 of the rotor 6 (having a radius of curvature equal to the radius of the rotor 6) and the radius of curvature may be larger than the radius of the rotor 6. The radius of the rotor 6 is not particularly limited to, but may be about ten to thousand times the width of the tip end surface 411.

In the plan view of the vibrating plate 3, a width W42 of the base end portion 42 is smaller than a width W41 of the tip end portion 41 and a relationship of W42<W41 is satisfied. Note that the width W42 of the base end portion 42 refers to a width (length) of the base end portion 42 in a direction crossing the direction in which the tip end portion 41 and the base end portion 42 are arranged (the above described projection direction of the contact part 4), and the width W41 of the tip end portion 41 refers to a width (length) of the tip end portion 41 in the crossing direction. As described above, the relationship of W42<W41 is satisfied, and thereby, the rigidity of the base end portion 42 may be made lower than the rigidity of the tip end portion 41 by the relatively simple configuration. Note that "rigidity" in the specification refers to bending rigidity in the width direction of the contact part 4.

The base end portion 42 connects the center part of the tip end portion 41 in the width direction (the crossing direction) and the vibrating plate 3. Accordingly, the contact part 4 has a T-shape. According to the configuration, the tip end portion 41 may be supported with balance by the base end portion 42. Further, the shape of the contact part 4 is relatively simple and, for example, the manufacture of the contact part 4 is easier.

Here, the relationship between the width W41 of the tip end portion 41 and the width W42 of the base end portion 42 is not particularly limited as long as the relationship of W42<W41 is satisfied as described above, however, for example, it is preferable that a relationship of W41/3≤W42≤W41/2 is satisfied. The relationship is satisfied, and thereby, the mechanical strength of the base end portion 42 may be secured and the rigidity of the base end portion 42 may be made sufficiently lower than the rigidity of the tip end portion 41. Further, the relationship between the width W41 of the tip end portion 41 and a width W31 of the reinforcing plate 31 is not particularly limited, however, for example, it is preferable that a relationship of W41<W31 is satisfied and more preferable that a relationship of W31/3≤W41≤W31/5 is satisfied. The relationships are satisfied, and thereby, excessive upsizing of the tip end portion 41 may be prevented and the area of the tip end surface 411 may be secured to be sufficiently large. Furthermore, the thickness of the contact part 4 is not particularly limited, however, in the embodiment, nearly equal to the thickness of the reinforcing plate 31.

As examples of specific sizes of the widths W41, W42, W31, the width W41 may be about from 200 μm to 500 μm, the width W42 may be about from 150 μm to 250 μm, and the width W31 may be about from 1 mm to 2 mm.

The constituent material of the contact part 4 is not particularly limited, but a material having good friction resistance is preferable. The materials having good friction resistance include various ceramics such as alumina and zirconia, sapphire, quartz crystal, etc.

As above, the contact part 4 is explained. Note that, in the embodiment, the cross-sectional shape of the base end portion 42 is the rectangular shape, however, the cross-sectional shape of the base end portion 42 is not particularly limited to, but may be a circular shape, oval shape, triangular shape, polygonal shape with five or more vertices, or odd shape.

The contact part 4 is joined to the reinforcing plate 31 by the adhesive 5. As shown in FIG. 4, the adhesive 5 has a base portion 51 located between a base end surface 42a of the base end portion 42 and a tip end surface 31a of the reinforcing plate 31 and joining these surfaces, and fillet portions 52 in fillet shapes located over a side surface 42b of the base end portion 42 and the tip end surface 31a of the reinforcing plate 31 and joining these surfaces. The adhesive 5 has the above described configuration, and thereby, the joining area between the contact part 4 and the reinforcing plate 31 becomes larger and they may be joined more strongly. That is, the fillet portions 52 also have anchor effects.

Here, it is preferable that the fillet portions 52 extend to the middle in the extension direction of the base end portion 42 as shown in the embodiment. In other words, it is preferable that the adhesive 5 is not provided on the tip end side of the side surface 42b of the base end portion 42. Thereby, unintended rigidity increase of the base end portion 42 may be suppressed.

The adhesive 5 is not particularly limited, but a combined light-curing and heat-curing adhesive (an adhesive curable by both light and heat) is preferable. The combined light-curing and heat-curing adhesive is used as the adhesive 5, and thereby, as will be described later in the eighth embodiment, the fillet portions 52 maybe formed more reliably. Note that the combined light-curing and heat-curing adhesive is not particularly limited to, but may be e.g. an epoxy-based adhesive, acrylic adhesive, or the like.

As above, the piezoelectric actuator 1 is explained in detail. Note that, in the embodiment, the configuration in which the piezoelectric elements 32 are provided on one surface of the reinforcing plate 31 is explained, however, for example, the piezoelectric elements 32 may be provided on both surfaces of the reinforcing plate 31. In this case, the piezoelectric elements 32a, 32b, 32c, 32d, 32e may be symmetrically provided with respect to the reinforcing plate 31. As described above, the piezoelectric elements 32 are provided on both surfaces of the reinforcing plate 31, and thereby, bending of the reinforcing plate 31 in the thickness direction may be reduced. Further, the piezoelectric actuator 1 may have a fixing part for fixing the piezoelectric actuator 1 to an object and a connecting part that connects the fixing part and the reinforcing plate 31.

In the embodiment, "second portion" is formed by the base end portion 42 of the contact part 4, however, the configuration of the second portion is not particularly limited. For example, the second portion may be formed by an aggregate of the base end portion 42 and the adhesive 5 or may be formed by the adhesive 5. As described above, the second portion contains a resin, and thereby, the second portion having the lower rigidity may be obtained relatively easily.

Second Embodiment

Next, a piezoelectric actuator according to the second embodiment will be explained.

Figure 5:
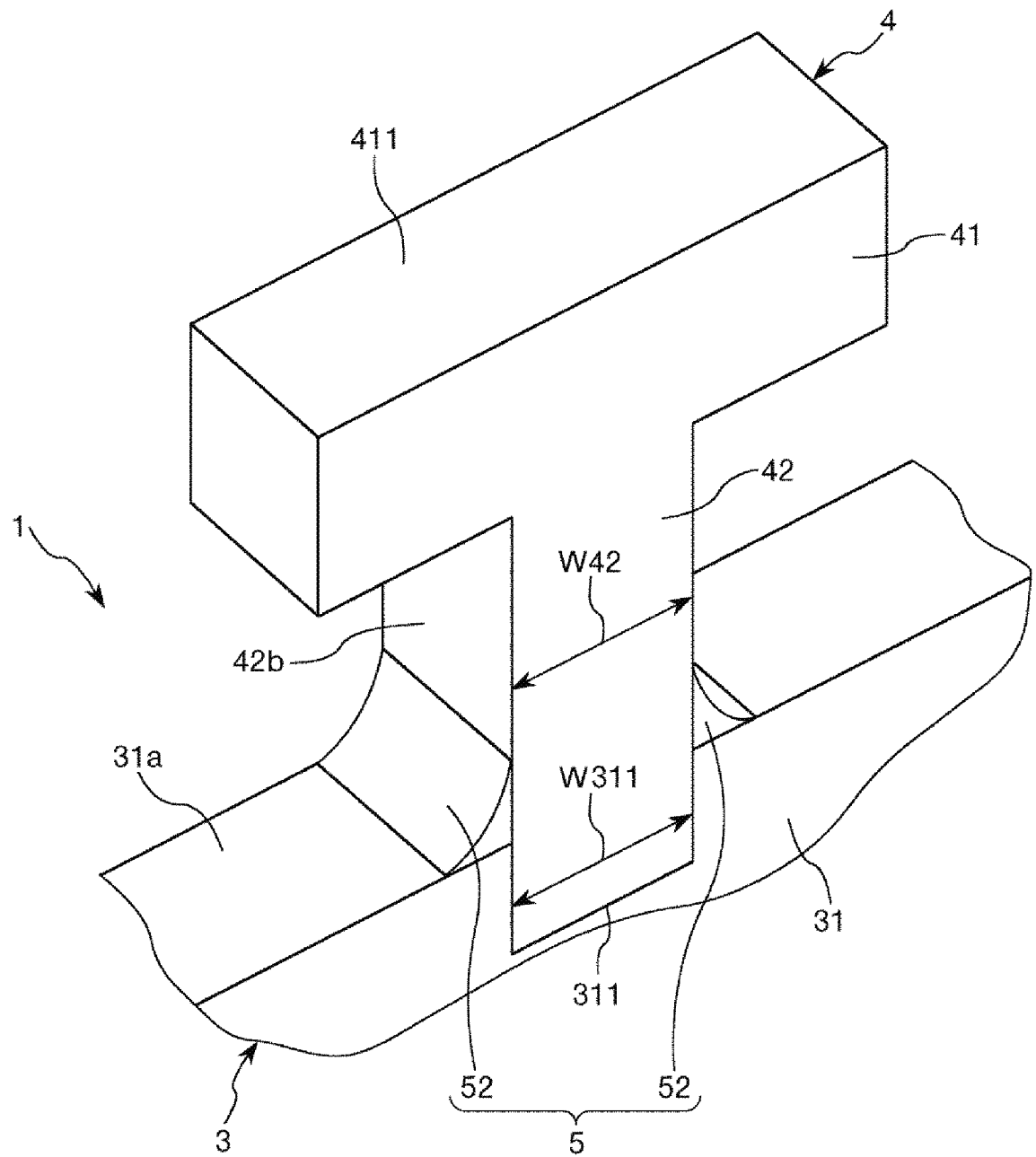
FIG. 5 is a partially enlarged perspective view of a piezoelectric actuator according to the second embodiment of the invention.

FIG. 5 is a partially enlarged perspective view of the piezoelectric actuator according to the second embodiment of the invention.

The embodiment is the same as the above described first embodiment except that the joining structure between the contact part and the vibrator is different.

Note that, in the following explanation, the embodiment will be explained with a focus on the differences from the above described embodiment and the explanation of the same items will be omitted. Further, in FIG. 5, the same configurations as those of the above described embodiment have the same signs.

As shown in FIG. 5, in the piezoelectric actuator 1 of the embodiment, the vibrating plate 3 has a concave portion 311 and the end portion on the base end side (reinforcing plate 31 side) of the base end portion 42 of the contact part 4 is inserted into the concave portion 311. Specifically, the concave portion 311 is a cutout formed in the tip end portion of the reinforcing plate 31, and penetrates the reinforcing plate 31 in the thickness direction thereof and opens in the tip end surface 31a of the reinforcing plate 31. Further, in the plan view as seen from the thickness direction of the reinforcing plate 31, a width W311 of the concave portion 311 is equal to the width W42 of the base end portion 42 or slightly smaller than the width W42, and the concave portion 311 and the base end portion 42 are fitted. The adhesive 5 has the fillet portions 52 located over the side surface 42b of the base end portion 42 and the tip end surface 31a of the reinforcing plate 31 and joining these surfaces. As described above, the reinforcing plate 31 and the contact part 4 are joined by fitting, and thereby, the joining strength between them may be further improved. Particularly, in the embodiment, the adhesive 5 is further provided, and thereby, the joining strength between the reinforcing plate 31 and the contact part 4 may be further increased by the synergistic effect of the fitting and the adhesive 5. Further, the concave portion 311 is provided in the reinforcing plate 31, and thereby, the contact part 4 may be positioned and the contact part 4 may be provided in a desired place more accurately and more easily.

According to the second embodiment, the same advantages as those of the above described first embodiment may be exerted. Note that, in the embodiment, the adhesive 5 may be omitted. Further, the width W311 of the concave portion 311 may be slightly larger than the width W42 of the base end portion 42 and the adhesive 5 is also provided between the concave portion 311 and the base end portion 42.

Third Embodiment

Next, a piezoelectric actuator according to the third embodiment will be explained.

Figure 6:
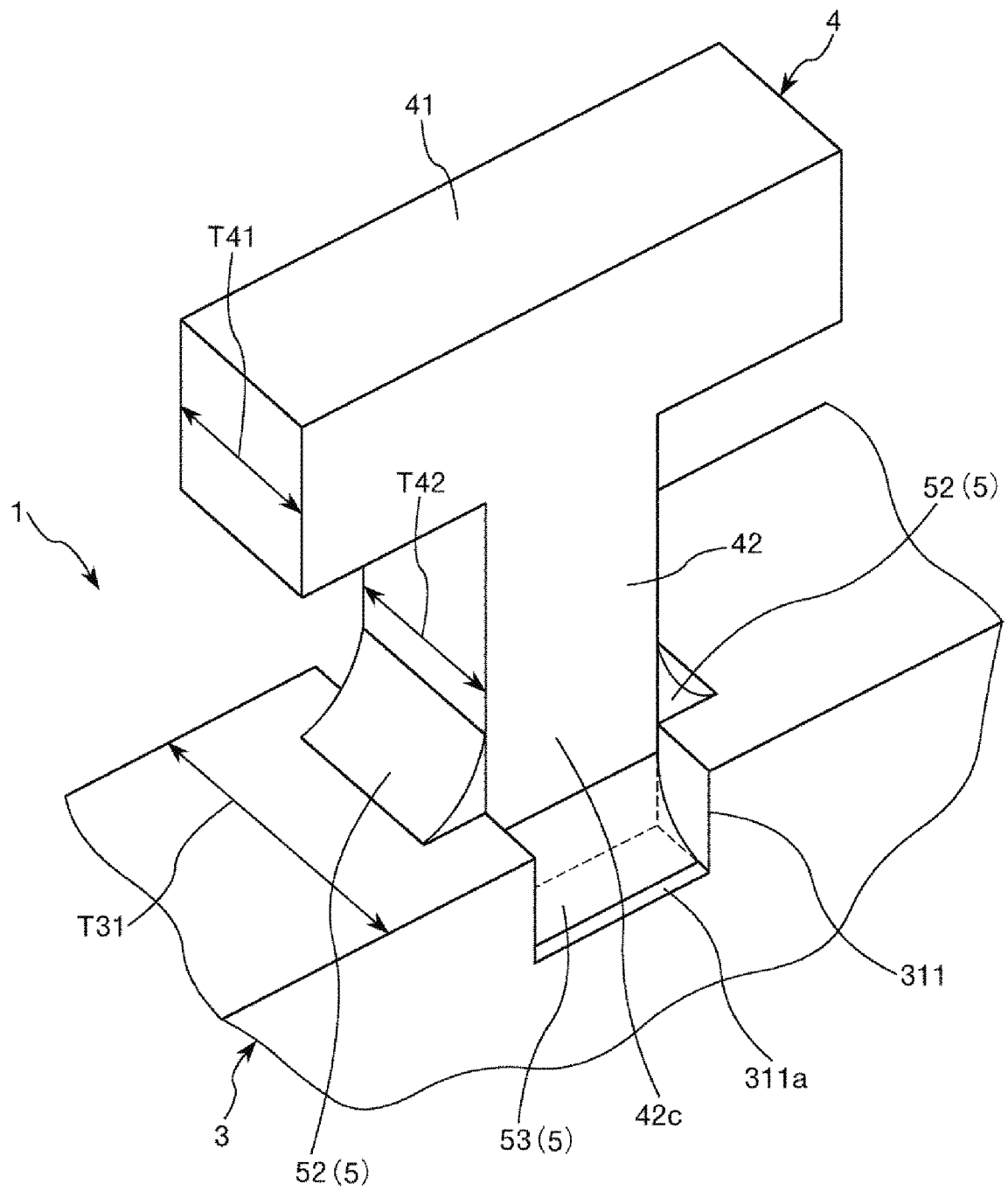
FIG. 6 is a partially enlarged perspective view of a piezoelectric actuator according to the third embodiment of the invention.

FIG. 6 is a partially enlarged perspective view of the piezoelectric actuator according to the third embodiment of the invention.

The embodiment is the same as the above described second embodiment except that the configuration of the contact part is different.

Note that, in the following explanation, the embodiment will be explained with a focus on the differences from the above described embodiments and the explanation of the same items will be omitted. Further, in FIG. 6, the same configurations as those of the above described embodiments have the same signs.

As shown in FIG. 6, in the piezoelectric actuator 1 of the embodiment, a thickness T42 of the base end portion 42 of the contact part 4 (a length of the reinforcing plate 31 in the thickness direction) is smaller than the thickness T31 of the reinforcing plate 31 (the relationship between a thickness T41 of the tip end portion 41 and a thickness T31 of the reinforcing plate 31 is the same). The contact part 4 and the reinforcing plate 31 are placed so that the centers in the thickness directions may coincide with each other. By the placement, a step is formed between a principal surface 42c of the base end portion 42 and a bottom surface 311a of the concave portion 311. The adhesive 5 has a fillet portion 53 in a fillet shape located over the principal surface 42c of the base end portion 42 and the bottom surface 311a of the concave portion 311 and joining these surfaces. That is, the adhesive 5 has the fillet portion 53 in addition to the fillet portions 52. The adhesive 5 has the above described configuration, and thereby, for example, compared to the above described second embodiment, the joining area between the contact part 4 and the reinforcing plate 31 becomes larger and they may be joined more strongly. Note that it is preferable that the fillet portion 53 extends to the middle in the extension direction of the base end portion 42 like the fillet portions 52. Thereby, unintended rigidity increase of the base end portion 42 may be suppressed.

According to the third embodiment, the same advantages as those of the above described first embodiment may be exerted. Note that, in the respective embodiments, the thickness T41 of the tip end portion 41 is shown as being equal to the thickness T42 of the base end portion 42, however, for example, T41>T42 may be satisfied, not limited to that.

Fourth Embodiment

Next, a piezoelectric actuator according to the fourth embodiment will be explained.

Figure 7:
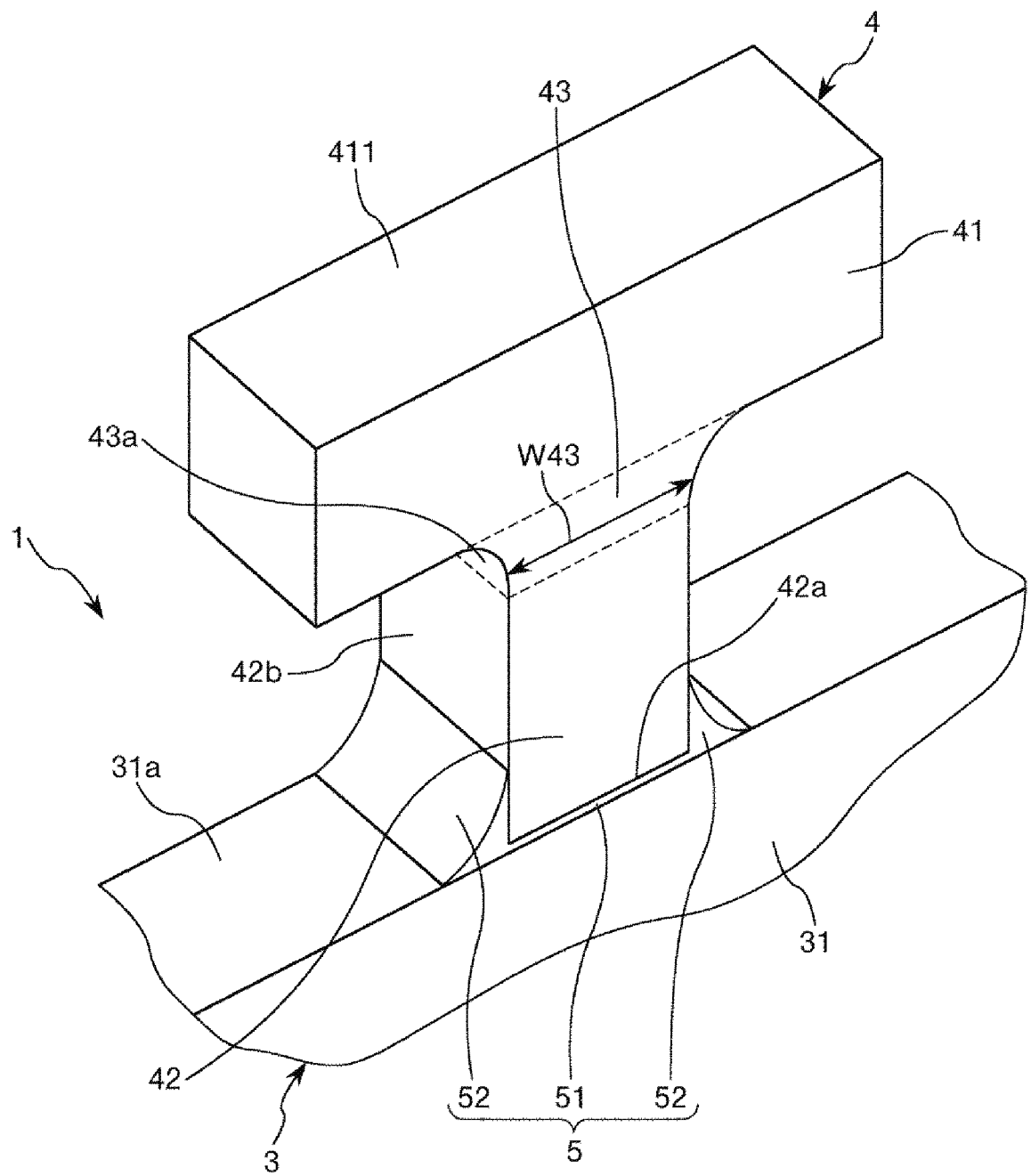
FIG. 7 is a partially enlarged perspective view of a piezoelectric actuator according to the fourth embodiment of the invention.

FIG. 7 is a partially enlarged perspective view of the piezoelectric actuator according to the fourth embodiment of the invention.

The embodiment is the same as the above described first embodiment except that the configuration of the contact part is different.

Note that, in the following explanation, the embodiment will be explained with a focus on the differences from the above described embodiments and the explanation of the same items will be omitted. Further, in FIG. 7, the same configurations as those of the above described embodiments have the same signs.

As shown in FIG. 7, in the piezoelectric actuator 1 of the embodiment, the contact part 4 has an intermediate portion 43 as a third portion located between the tip end portion 41 and the base end portion 42 in addition to the tip end portion 41 (first portion) and the base end portion 42 (second portion). The intermediate portion 43 has a width W43 (a width (length) in a direction crossing the arrangement direction of the tip end portion 41 and the base end portion 42) gradually decreasing from the tip end portion 41 side toward the base end portion 42 side in the plan view as seen from the thickness direction of the reinforcing plate 31. Thereby, the rigidity may be gradually changed from the tip end portion 41 to the base end portion 42, and stress concentration on a boundary part between the tip end portion 41 and the base end portion 42 may be reduced. Accordingly, the contact part 4 is harder to break. Particularly, in the embodiment, a side surface 43a of the intermediate portion 43 is formed by a curved surface, and the side surfaces of the tip end portion 41 and the base end portion 42 and the side surface of the intermediate portion 43 may be a continuous surface. Accordingly, the above described advantages are more remarkable. Note that the shape of the side surface of the intermediate portion 43 is not particularly limited to, but may be a flat surface.

According to the fourth embodiment, the same advantages as those of the above described first embodiment may be exerted. Note that, in the other embodiments (without the intermediate portion 43) than the embodiment, the width W42 of the base end portion 42 may have a portion that gradually decreases or gradually increases along the arrangement direction of the tip end portion 41 and the base end portion 42.

Fifth Embodiment

Next, a piezoelectric actuator according to the fifth embodiment will be explained.

Figure 8:
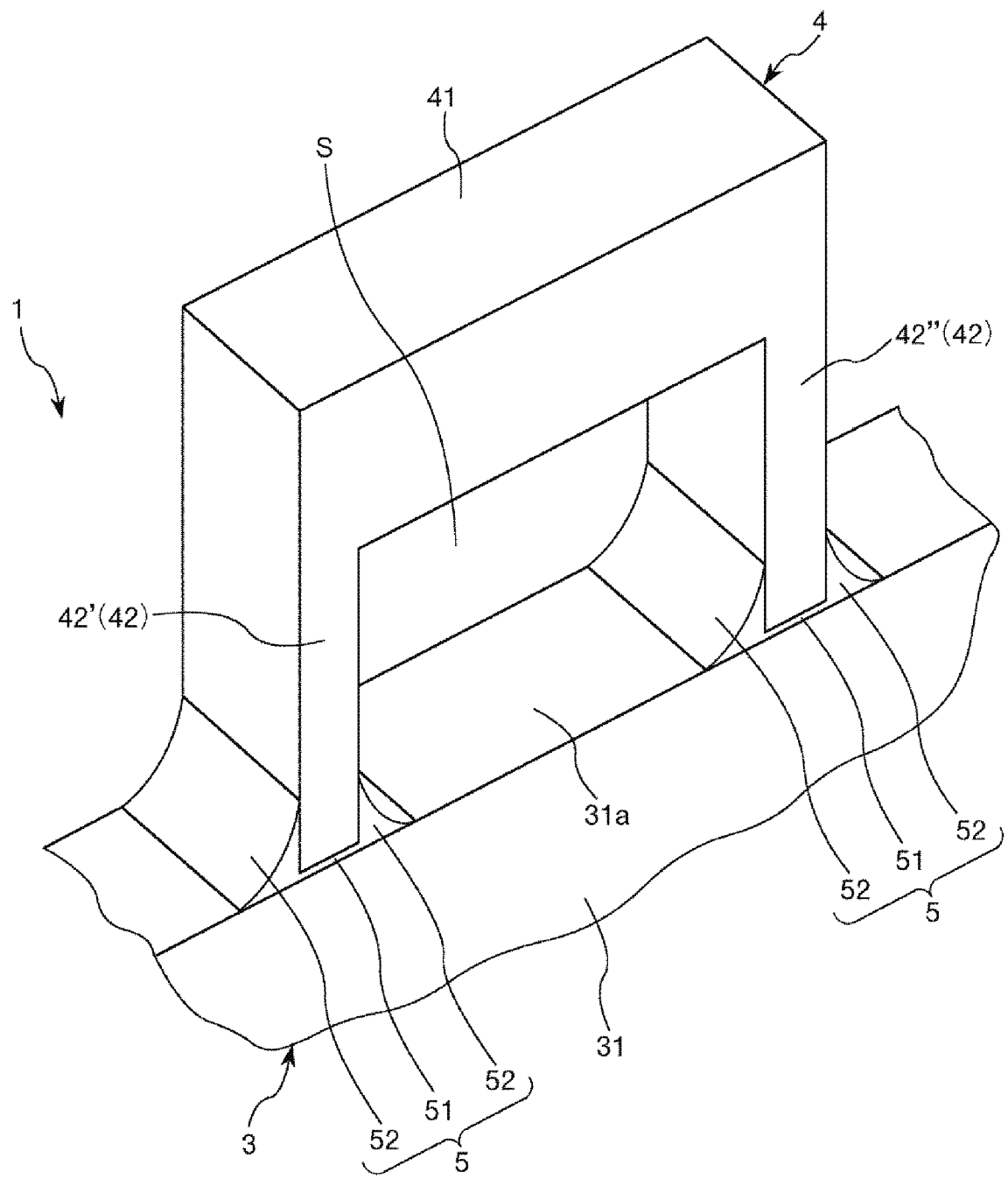
FIG. 8 is a partially enlarged perspective view of a piezoelectric actuator according to the fifth embodiment of the invention.

FIG. 8 is a partially enlarged perspective view of the piezoelectric actuator according to the fifth embodiment of the invention.

The embodiment is the same as the above described first embodiment except that the configuration of the contact part is different.

Note that, in the following explanation, the embodiment will be explained with a focus on the differences from the above described embodiments and the explanation of the same items will be omitted. Further, in FIG. 8, the same configurations as those of the above described embodiment have the same signs.

As shown in FIG. 8, in the contact part 4 of the embodiment, the base end portion 42 (second portion) has two divided pieces 42', 42" provided apart in the width direction of the contact part 4 (the direction crossing the arrangement direction of the tip end portion 41 and the base end portion 42). According to the configuration, the rigidity of the base end portion 42 may be made lower than the rigidity of the tip end portion 41 by the relatively simple configuration. Further, one divided piece 42' connects one end part of the tip end portion 41 in the width direction (the crossing direction) and the vibrating plate 3 (reinforcing plate 31), and the other divided piece 42" connects the other end part of the tip end portion 41 in the width direction (the crossing direction) and the vibrating plate 3 (reinforcing plate 31). The sum of the widths of the respective divided pieces 42', 42" is smaller than the width of the tip end portion 41. As described above, the divided pieces 42', 42" are connected to both end parts of the tip end portion 41, and thereby, the tip end portion 41 may be supported by the base end portion 42 with balance. Further, the shape of the contact part 4 becomes relatively simple and, for example, the manufacture of the contact part 4 become easier. Furthermore, the strength of the both end parts of the tip end portion 41 may be reinforced and the possibility of breakage of the tip end portion 41 may be effectively reduced. A space S surrounded by the tip end portion 41, the divided pieces 42', 42", and the reinforcing plate 31 is formed in the plan view as seen from the thickness direction of the reinforcing plate 31. The space S is provided, and thereby, for example, the center part of the contact part 4 may be easily bent and the possibility of breakage of the contact part 4 due to application of excessive stress may be reduced.

According to the fifth embodiment, the same advantages as those of the above described first embodiment may be exerted. Note that the number of divided pieces of the base end portion 42 is not limited to two, but may be three or more. For example, the base end portion 42 may have a divided piece coupling the center part of the tip end portion 41 in the width direction and the reinforcing plate 31 in addition to the divided pieces 42', 42".

Sixth Embodiment

Next, a piezoelectric actuator according to the sixth embodiment will be explained.

Figure 9:
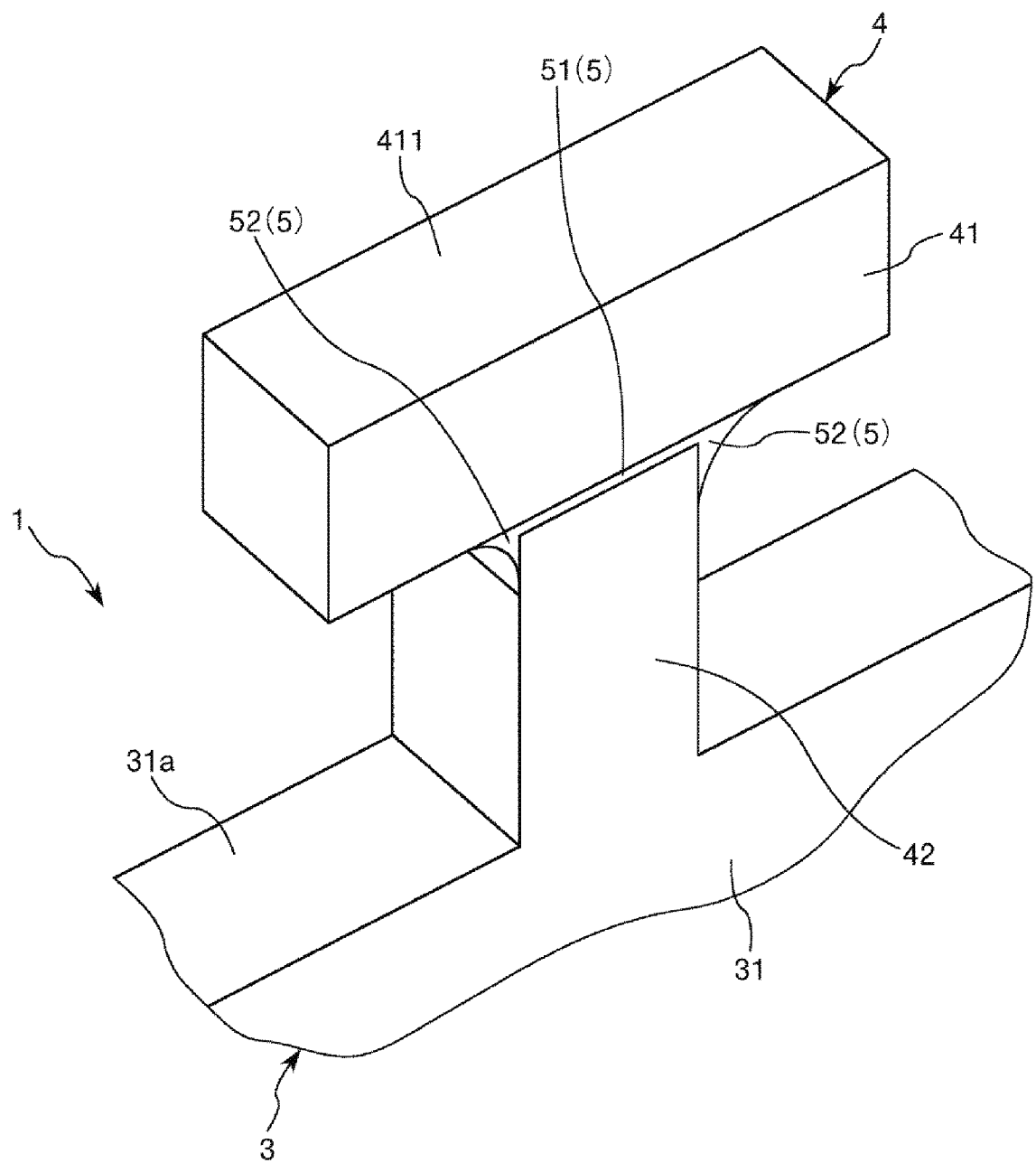
FIG. 9 is a partially enlarged perspective view of a piezoelectric actuator according to the sixth embodiment of the invention.

FIG. 9 is a partially enlarged perspective view of the piezoelectric actuator according to the sixth embodiment of the invention.

The embodiment is the same as the above described first embodiment except that the configuration of the contact part is different.

Note that, in the following explanation, the embodiment will be explained with a focus on the differences from the above described embodiments and the explanation of the same items will be omitted. Further, in FIG. 9, the same configurations as those of the above described embodiments have the same signs.

As shown in FIG. 9, in the contact part 4 of the embodiment, the tip end portion 41 and the base end portion 42 are separately formed, and the tip end portion 41 (first portion) and the base end portion 42 (second portion) are formed using different materials. As described above, the tip end portion 41 and the base end portion 42 are formed using different materials, and thereby, the rigidity of the base end portion 42 may be simply made lower than the rigidity of the tip end portion 41.

Note that the constituent material of the tip end portion 41 includes, but is not particularly limited to, e.g. various ceramics such as alumina and zirconia, sapphire, quartz crystal, etc. Thereby, the tip end portion 41 with good friction resistance may be obtained. On the other hand, the constituent material of the base end portion 42 is not particularly limited to, but preferably the same material as that of the reinforcing plate 31 (e.g. silicon), for example. Thereby, the base end portion 42 and the reinforcing plate 31 may be integrally formed. Accordingly, formation of the base end portion 42 is easier. Note that, in the embodiment, the base end portion 42 and the reinforcing plate 31 are integrally formed from a silicon board.

The separately formed tip end portion 41 and base end portion 42 are joined by the adhesive 5. The adhesive 5 has a base portion 51 located between a base end surface of the tip end portion 41 and a tip end surface of the base end portion 42 and joining these surfaces, and fillet portions 52 located over the base end surface of the tip end portion 41 and a side surface of the base end portion 42 and joining these surfaces.

According to the sixth embodiment, the same advantages as those of the above described first embodiment may be exerted.

Seventh Embodiment

Next, a piezoelectric actuator according to the seventh embodiment will be explained.

Figure 10:
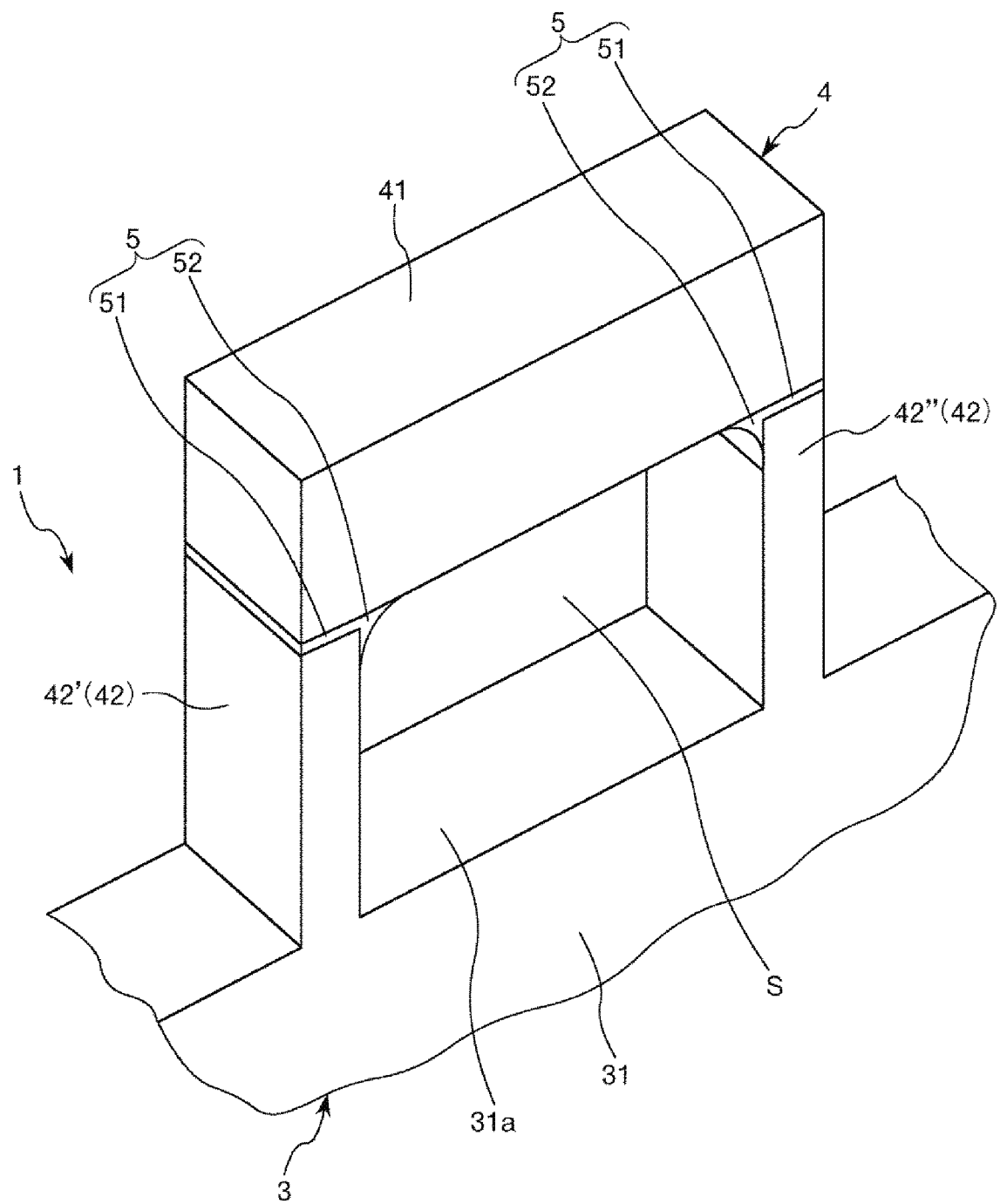
FIG. 10 is a partially enlarged perspective view of a piezoelectric actuator according to the seventh embodiment of the invention.

FIG. 10 is a partially enlarged perspective view of the piezoelectric actuator according to the seventh embodiment of the invention.

The embodiment is the same as the above described first embodiment except that the configuration of the contact part is formed by a combination of the above described fifth embodiment and sixth embodiment.

Note that, in the following explanation, the embodiment will be explained with a focus on the differences from the above described embodiments and the explanation of the same items will be omitted. Further, in FIG. 10, the same configurations as those of the above described embodiments have the same signs.

As shown in FIG. 10, in the contact part 4 of the embodiment, the base end portion 42 has two divided pieces 42', 42" provided apart in the width direction. Further, the tip end portion 41 and the base end portion 42 (divided pieces 42', 42") are separately formed, and the tip end portion 41 and the base end portion 42 are formed using different materials. Furthermore, the base end portion 42 is integrally formed with the reinforcing plate 31. Moreover, the tip end portion 41 and the respective divided pieces 42', 42" are joined by the adhesive 5.

According to the seventh embodiment, the same advantages as those of the above described first embodiment may be exerted.

Eighth Embodiment

Next, a piezoelectric actuator according to the eighth embodiment will be explained.

Figure 11:
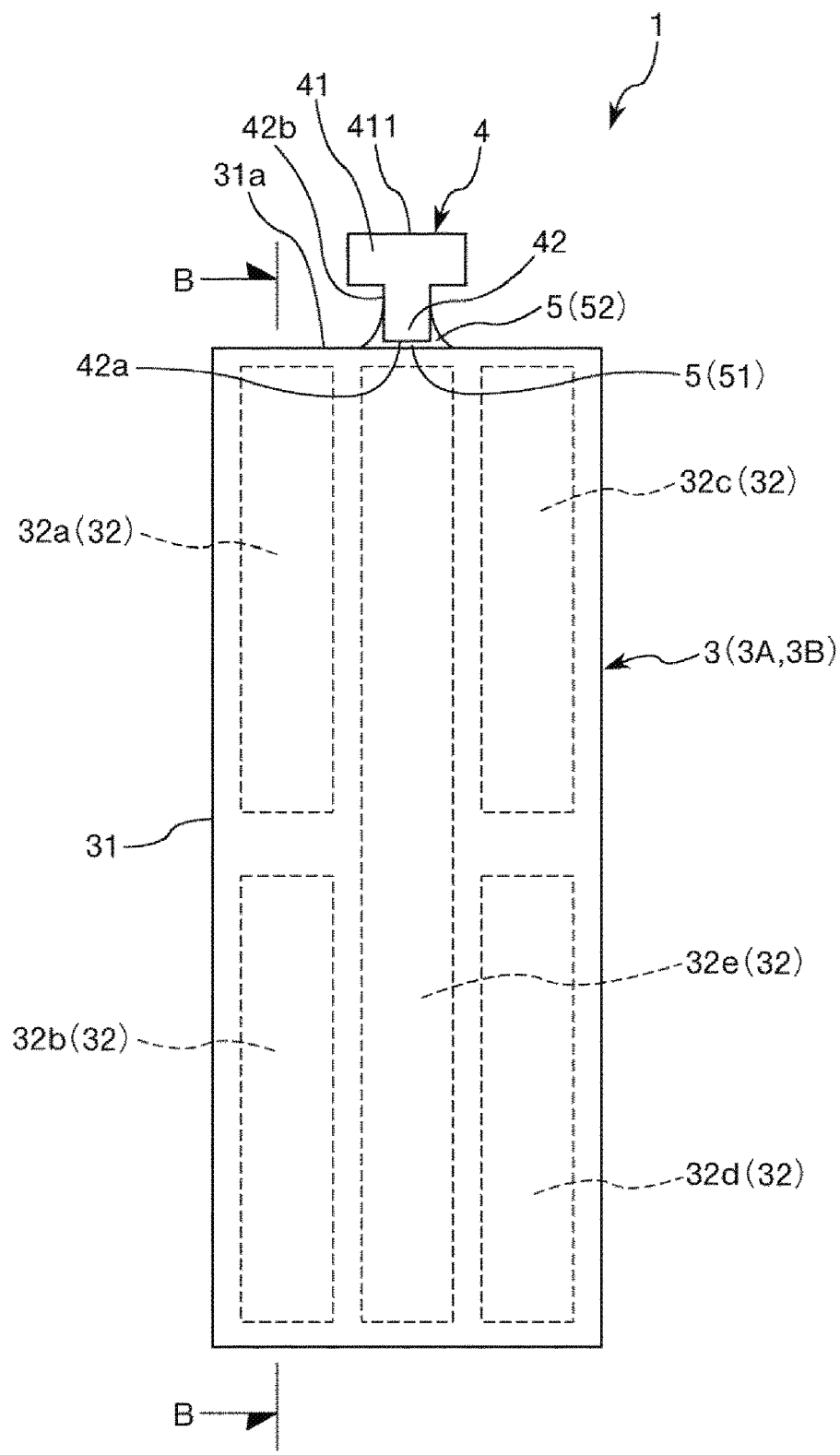
FIG. 11 is a plan view of a piezoelectric actuator according to the eighth embodiment of the invention.
Figure 12:
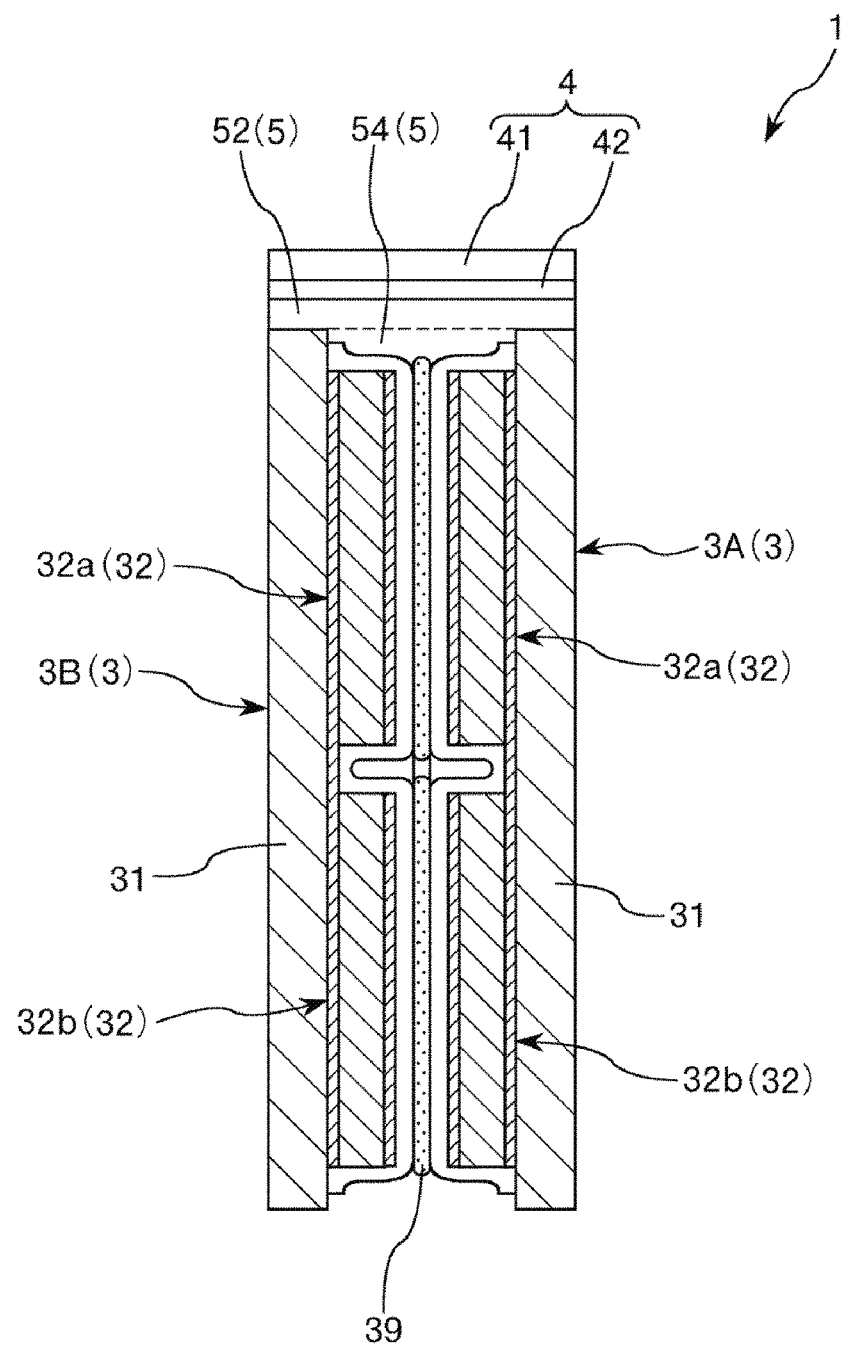
FIG. 12 is a sectional view along line B-B in FIG. 11.
Figure 13:
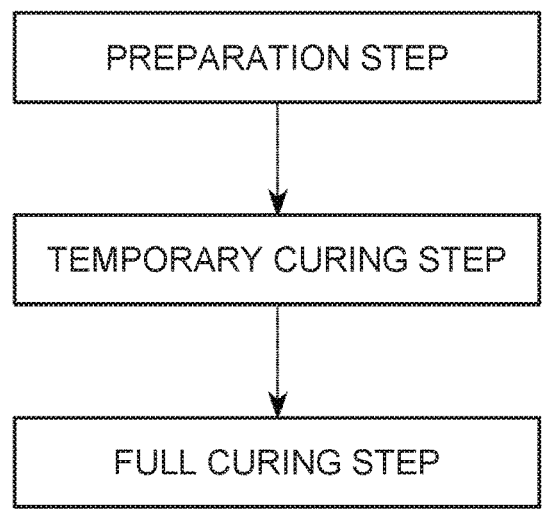
FIG. 13 is a flowchart showing a manufacturing method of the piezoelectric actuator shown in FIG. 11.

FIG. 11 is a plan view of the piezoelectric actuator according to the eighth embodiment of the invention. FIG. 12 is a sectional view along line B-B in FIG. 11. FIG. 13 is a flowchart showing a manufacturing method of the piezoelectric actuator shown in FIG. 11. FIGS. 14 to 18 show the manufacturing method of the piezoelectric actuator shown in FIG. 11.

The embodiment is the same as the above described first embodiment except that the configuration of the vibrator is different.

Note that, in the following explanation, the embodiment will be explained with a focus on the differences from the above described embodiments and the explanation of the same items will be omitted. Further, in FIGS. 11 to 18, the same configurations as those of the above described embodiments have the same signs.

As shown in FIGS. 11 and 12, in the piezoelectric actuator 1 of the embodiment, the vibrating plate 3 has a pair of vibrating plate units 3A, 3B and a bonding layer 39 located between the pair of vibrating plate units 3A, 3B and joining the vibrating plate units 3A, 3B. Note that the two vibrating plate units 3A, 3B are symmetrically formed with respect to the bonding layer 39 and have the same configuration as each other.

The vibrating plate units 3A, 3B each has a reinforcing plate 31 (shim) having a nearly rectangular shape and a plurality of piezoelectric elements 32 provided on one surface of the reinforcing plate 31. Further, the two vibrating plate units 3A, 3B are joined with the piezoelectric elements 32 face each other via the bonding layer 39. The constituent material of the bonding layer 39 includes, but is not particularly limited to, e.g. epoxy-based resin.

The adhesive 5 has a base portion 51 located between tip end surfaces 31a of the respective reinforcing plates 31 and a base end surface 42a of the base end portion 42 of the contact part 4 and joining these surfaces, fillet portions 52 located over a side surface 42b of the base end portion 42 and the tip end surfaces 31a of the respective reinforcing plates 31 and joining these surfaces, and an inner filling portion 54 located between the two reinforcing plates 31 and joining the inner surfaces (the surfaces on the piezoelectric elements 32 sides) of the respective reinforcing plates 31 and the base end surface 42a of the base end portion 42. The adhesive 5 has the above described configuration, and thereby, the joining area between the contact part 4 and the reinforcing plates 31 becomes larger and they may be joined more strongly.

As above, the configuration of the piezoelectric actuator 1 is explained. Next, the manufacturing method of the piezoelectric actuator 1 will be explained. As shown in FIG. 13, the manufacturing method of the piezoelectric actuator 1 has a preparation step of preparing the vibrating plate 3 and the contact part 4, a temporary curing step of joining the vibrating plate 3 and the contact part 4 via the adhesive 5, and then, temporarily curing the adhesive 5, and a full curing step of fully curing the adhesive 5. As below, the manufacturing method will be specifically explained.

Preparation Step

Figure 14:
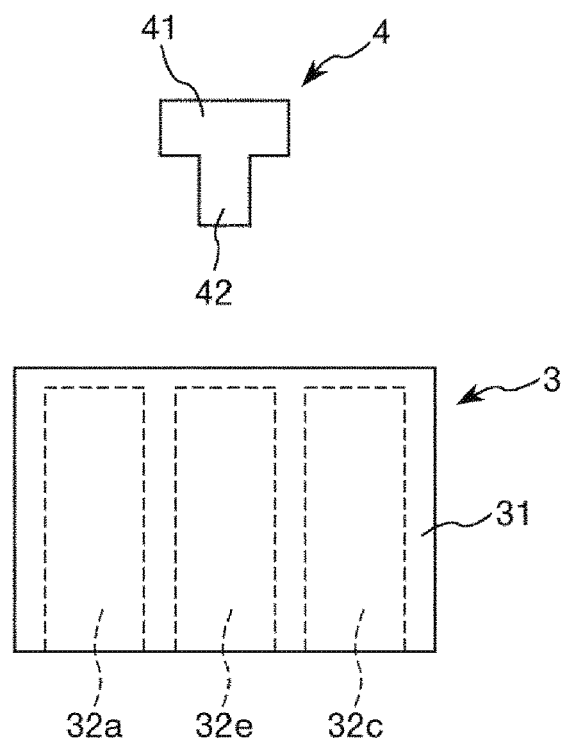
FIG. 14 shows the manufacturing method of the piezoelectric actuator shown in FIG. 11.

First, as shown in FIG. 14, the vibrating plate 3 and the contact part 4 are separately prepared. Note that, as described above, the vibrating plate 3 may be manufactured by bonding the two vibrating plate units 3A, 3B using the bonding layer 39.

Temporary Curing Step

Figure 15:
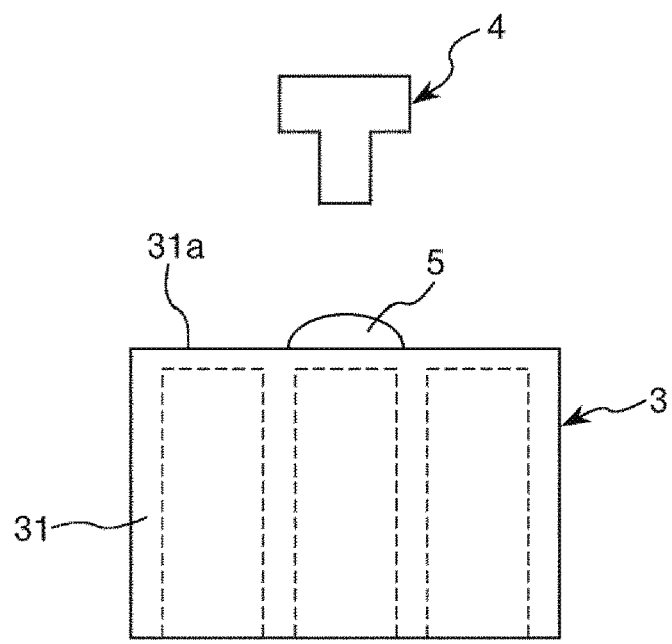
FIG. 15 shows the manufacturing method of the piezoelectric actuator shown in FIG. 11.
Figure 16:
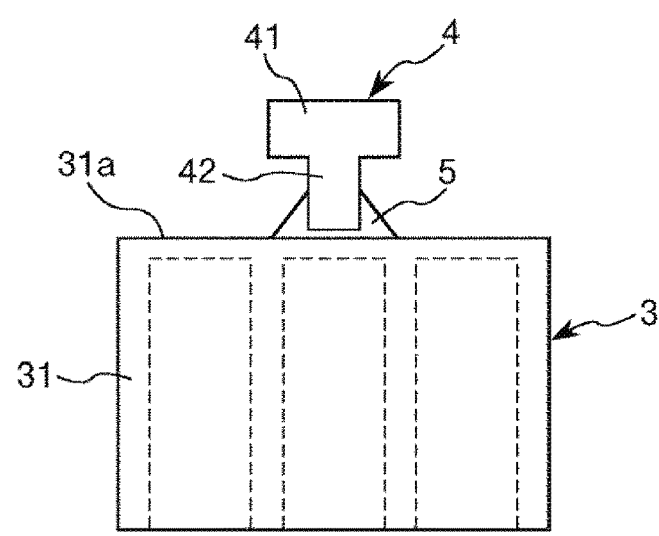
FIG. 16 shows the manufacturing method of the piezoelectric actuator shown in FIG. 11.
Figure 17:
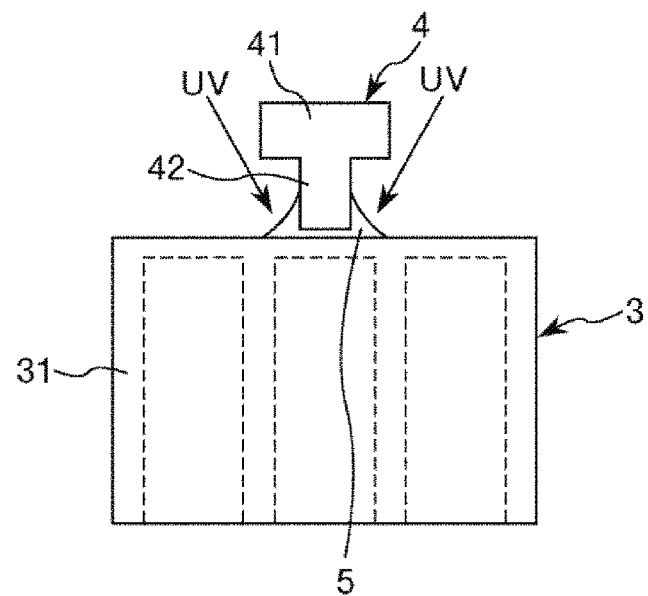
FIG. 17 shows the manufacturing method of the piezoelectric actuator shown in FIG. 11.

Then, as shown in FIG. 15, the adhesive 5 is applied to the vibrating plate 3. In this regard, the adhesive 5 is placed to fill between the two reinforcing plates 31 and run to the outside of the vibrating plates 3. Note that the adhesive 5 is a combined light-curing and heat-curing adhesive. Then, as shown in FIG. 16, the contact part 4 and the vibrating plate 3 are bonded via the adhesive 5. As described above, the adhesive 5 is placed to run to the outside of the vibrating plates 3, and thereby, the running out parts come into contact with the side surface 42b of the base end portion 42 into fillet shapes. Then, as shown in FIG. 17, an ultraviolet ray UV (light) is applied to the adhesive 5 and the adhesive 5 is temporarily cured.

Full Curing Step

Figure 18:
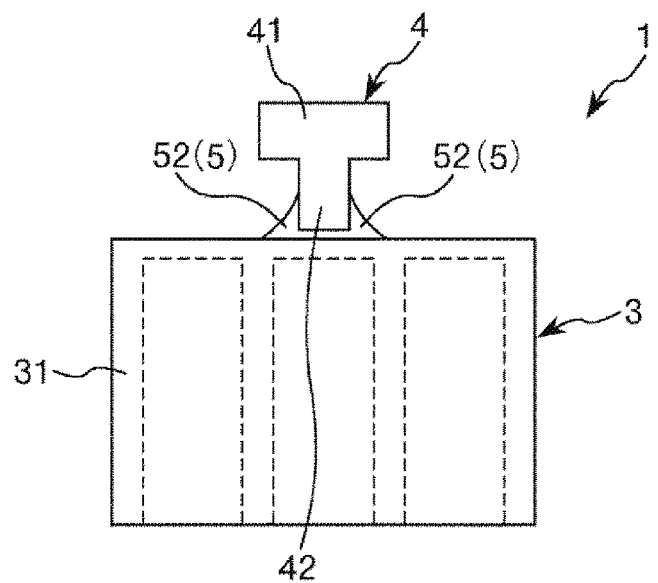
FIG. 18 shows the manufacturing method of the piezoelectric actuator shown in FIG. 11.

Then, the adhesive 5 is heated to be fully cured. Thereby, as shown in FIG. 18, the piezoelectric actuator 1 is obtained. Here, as described above, temporary curing (light curing) of the adhesive 5 is performed prior to the step. Accordingly, fluidity of the adhesive 5 (particularly, fluidity of the fillet shape parts) in the step may be effectively suppressed and the fillet portions 52 maybe formed more reliably. Therefore, according to the manufacturing method, the piezoelectric actuator 1 with higher joining strength between the vibrating plate 3 and the contact part 4 and better mechanical strength may be obtained.

According to the eighth embodiment, the same advantages as those of the above described first embodiment may be exerted.

Ninth Embodiment

Next, a robot according to the ninth embodiment of the invention will be explained.

Figure 19:
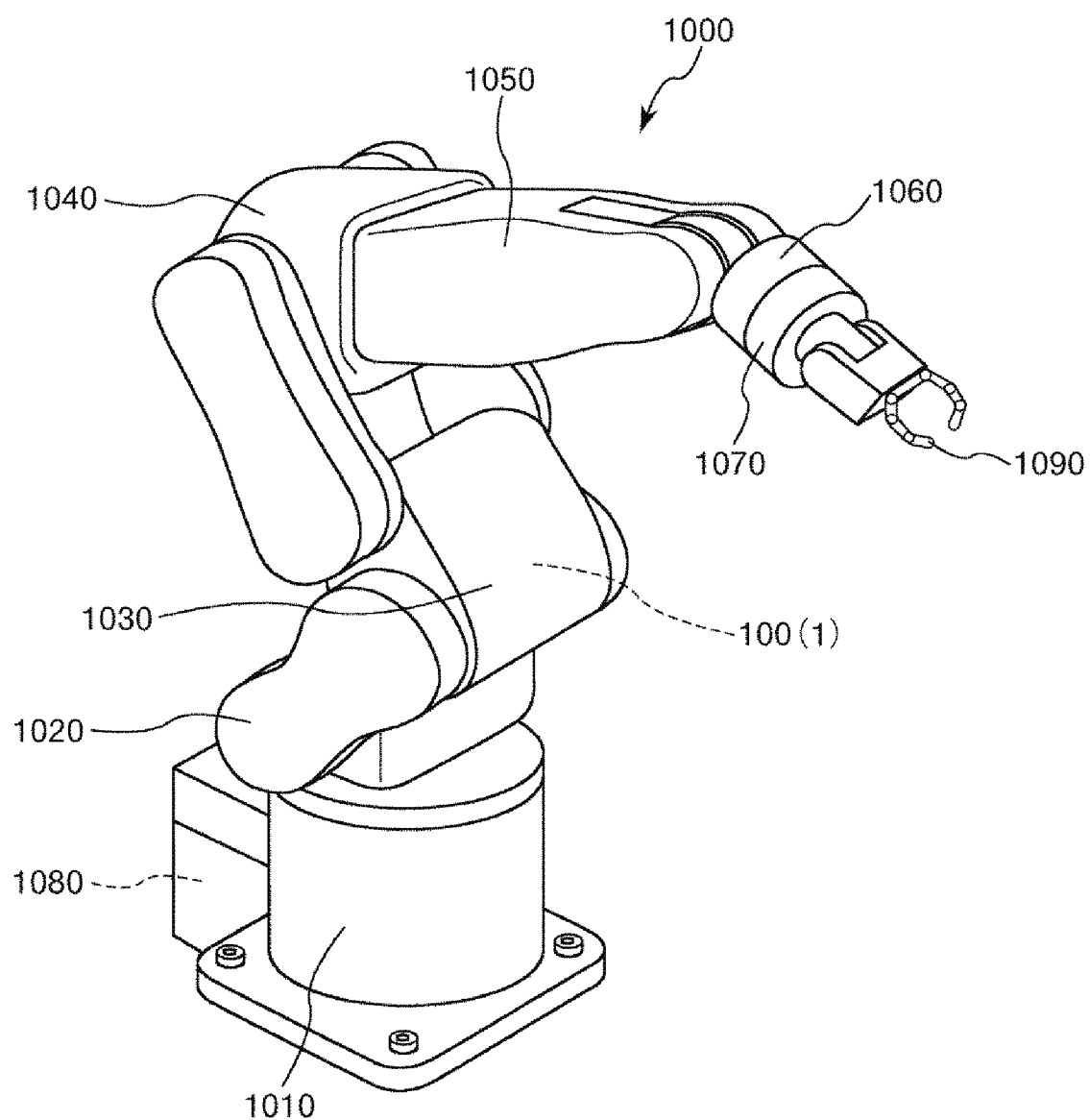
FIG. 19 is a perspective view of a robot according to the ninth embodiment of the invention.

FIG. 19 is a perspective view of the robot according to the ninth embodiment of the invention.

The robot 1000 shown in FIG. 19 may perform works of feeding, removing, carrying, assembly, etc. of precision apparatuses and components forming the apparatuses (objects). The robot 1000 is a six-axis robot, and has a base 1010 fixed to a floor or ceiling, an arm 1020 rotatably coupled to the base 1010, an arm 1030 rotatably coupled to the arm 1020, an arm 1040 rotatably coupled to the arm 1030, an arm 1050 rotatably coupled to the arm 1040, an arm 1060 rotatably coupled to the arm 1050, an arm 1070 rotatably coupled to the arm 1060, and a control unit 1080 that controls driving of these arms 1020, 1030, 1040, 1050, 1060, 1070. Further, a hand connecting part is provided in the arm 1070, and an end effector 1090 according to a work to be executed by the robot 1000 is attached to the hand connecting part. Piezoelectric motors 100 (piezoelectric actuators 1) are mounted on all or part of the respective joint parts, and the respective arms 1020, 1030, 1040, 1050, 1060, 1070 rotate by driving of the piezoelectric motors 100. Note that the driving of the respective piezoelectric motors 100 is controlled by the control unit 1080.

The robot 1000 includes the piezoelectric motors 100 (piezoelectric actuators 1), and thereby, may enjoy the above described advantages of the piezoelectric actuators 1 and may exert good reliability.

Tenth Embodiment

Next, an electronic component conveyance apparatus according to the tenth embodiment of the invention will be explained.

Figure 20:
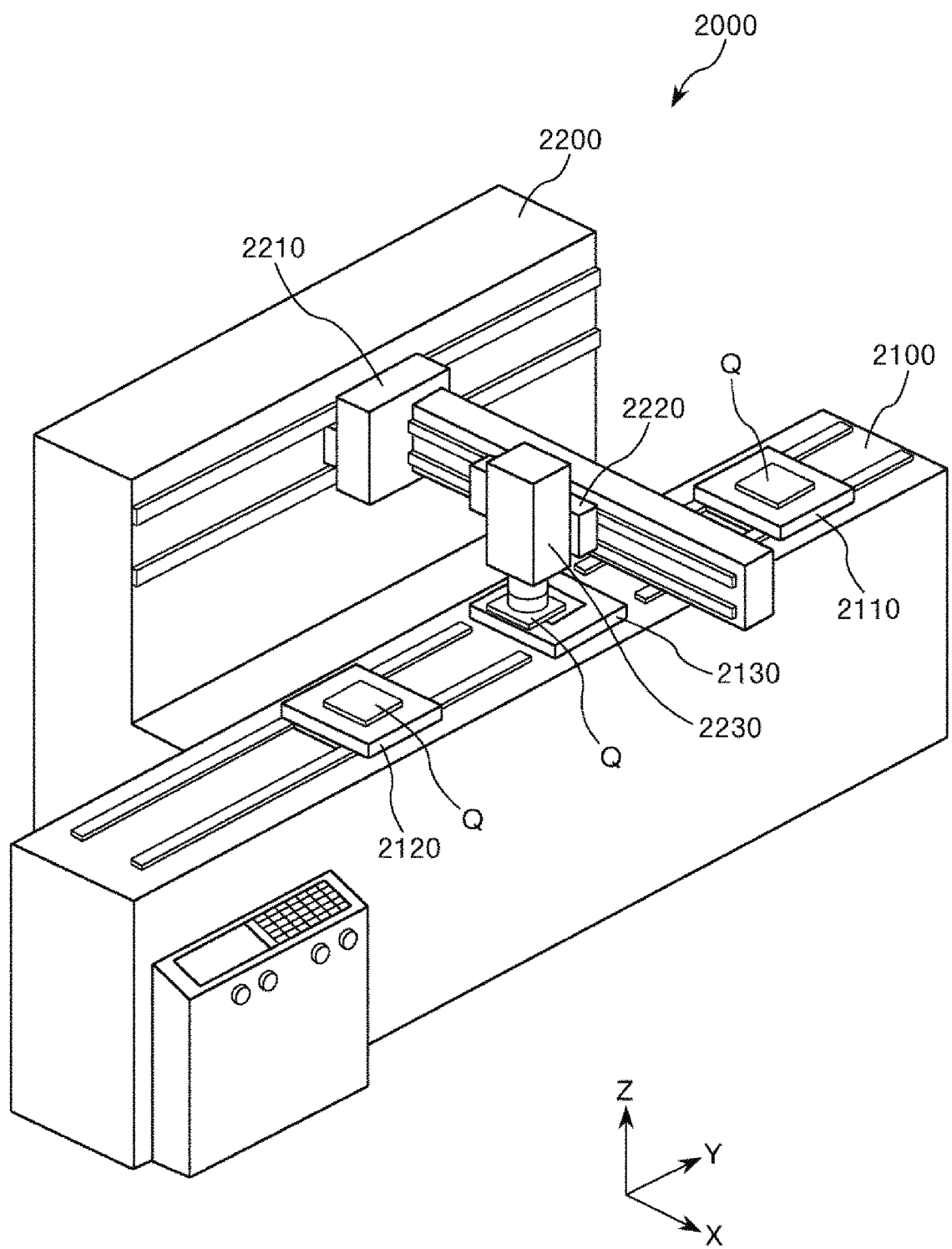
FIG. 20 is a perspective view of an electronic component conveyance apparatus according to the tenth embodiment of the invention.
Figure 21:
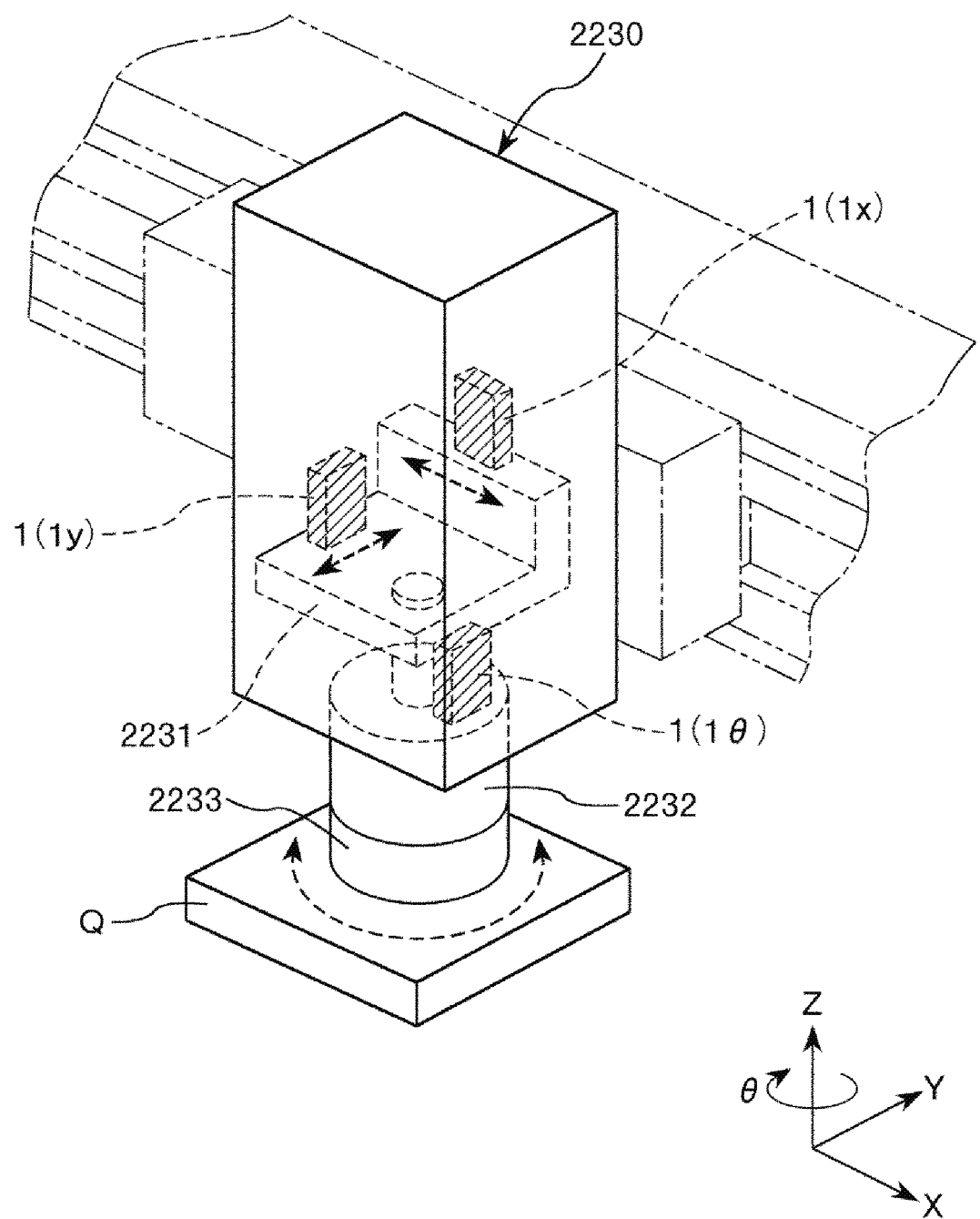
FIG. 21 is perspective view of an electronic component holding part of the electronic component conveyance apparatus shown in FIG. 20.

FIG. 20 is a perspective view of the electronic component conveyance apparatus according to the tenth embodiment of the invention. FIG. 21 is perspective view of an electronic component holding part of the electronic component conveyance apparatus shown in FIG. 20. Note that, hereinafter, for convenience of explanation, three axis orthogonal to one another are an X-axis, a Y-axis, and a Z-axis.

The electronic component conveyance apparatus 2000 shown in FIG. 20 is applied to an electronic component inspection apparatus, and has a base 2100 and a support 2200 provided on the side of the base 2100. Further, on the base 2100, an upstream stage 2110 on which an electronic component Q to be inspected is mounted and conveyed in the Y-axis direction, a downstream stage 2120 on which an electronic component Q that has been inspected is mounted and conveyed in the Y-axis direction, and an inspection table 2130 located between the upstream stage 2110 and the downstream stage 2120, on which electrical characteristics of an electronic component Q is inspected are provided. Note that examples of the electronic component Q include e.g. a semiconductor, semiconductor wafer, display device such as CLD and OLED, quartz device, various sensors, inkjet head, various MEMS devices, etc.

Further, a Y-stage 2210 movable in the Y-axis directions with respect to the support 2200 is provided on the support 2200, an X-stage 2220 movable in the X-axis directions with respect to the Y-stage 2210 is provided on the Y-stage 2210, and an electronic component holding part 2230 movable in the Z-axis directions with respect to the X-stage 2220 is provided on the X-stage 2220. As shown in FIG. 21, the electronic component holding part 2230 has a fine adjustment plate 2231 movable in the X-axis directions and the Y-axis directions, a rotation part 2232 rotatable about the Z-axis with respect to the fine adjustment plate 2231, and a holding part 2233 provided in the rotation part 2232 and holding the electronic component Q. Further, in the electronic component holding part 2230, a piezoelectric actuator 1 (1x) for moving the fine adjustment plate 2231 in the X-axis directions, a piezoelectric actuator 1 (1y) for moving the fine adjustment plate 2231 in the Y-axis directions, and a piezoelectric actuator 1 (1θ) for rotating the rotation part 2232 about the Z-axis are provided.

The electronic component conveyance apparatus 2000 includes the piezoelectric actuators 1, and thereby, may enjoy the above described advantages of the piezoelectric actuators 1 and may exert good reliability.

As above, the piezoelectric actuator, piezoelectric motor, robot, and electronic component conveyance apparatus according to the invention are explained based on the illustrated embodiments, however, the invention is not limited to those. The configurations of the respective parts may be replaced by arbitrary configurations having the same functions. Further, other arbitrary configurations may be added to the invention. Furthermore, the respective embodiments may be appropriately combined.

The entire disclosure of Japanese Patent Application No. 2016-148976, filed Jul. 28, 2016 is expressly incorporated by reference herein.

What is claimed is:

1. A piezoelectric actuator comprising:
a vibrating plate having a piezoelectric material extending along a first direction in a plan view, the vibrating plate being rectangular-shaped having four sides including a first side, the first side extending along a second direction perpendicular to the first direction in the plan view, a concave being provided in the first side of the vibrating plate; and
a contact member provided at the first side of the vibrating plate, the contact member being configured with first and second members connected to each other, a side of the first member directly contacting a driven part, an end of the second member being inserted into the concave provided in the first side of the vibrating plate,
wherein a length of the first member along the second direction in the plan view is longer than a width of the second member along the second direction in the plan view, and
a width of the first member along the first direction in the plan view is shorter than a length of the second member along the first direction in the plan view.

2. The piezoelectric actuator according to claim 1, wherein the end of the second member is inserted into the concave that is provided at a center of the first side of the vibrating plate in the second direction.

3. The piezoelectric actuator according to claim 1, wherein the second member has at least two divided pieces provided apart in the second direction, and the two divided pieces respectively contact the second member and the first side of the vibrating plate.

4. The piezoelectric actuator according to claim 3, wherein the two divided pieces sandwich the second member along the second direction.

5. The piezoelectric actuator according to claim 1, wherein the first member and the second member are continuously connected to each other via a third member,
a width of the third member in the second direction gradually increases in a direction from the second member toward the first member.

6. The piezoelectric actuator according to claim 1, wherein the first member and the second member are formed using different materials.

7. The piezoelectric actuator according to claim 1, wherein the second member contains a resin.

8. A piezoelectric motor comprising:
the driven part; and
the piezoelectric actuator according to claim 1,
wherein the driven part is a rotor, and the rotor rotates by the contact of the contact member.

9. The piezoelectric motor according to claim 8, wherein the end of the second member is inserted into the concave that is provided at a center of the first side of the vibrating plate in the second direction.

10. The piezoelectric motor according to claim 8, wherein the second member has at least two divided pieces provided apart in the second direction, and the two divided pieces respectively contact the second member and the first side of the vibrating plate.

11. A robot comprising:
a base;
an arm connected to the base via a joint;
a motor disposed at the joint so as to move the arm relative to the base, the motor being configured with a piezoelectric actuator, the piezoelectric actuator including:
a vibrating plate having a piezoelectric material extending along a first direction in a plan view, the vibrating plate being rectangular-shaped so as to have four sides including a first side, the first side extending along a second direction perpendicular to the first direction in the plan view, a concave being provided in the first side of the vibrating plate; and
a contact member provided at the first side of the vibrating plate, the contact member being configured with first and second members connected to each other, a side of the first member directly contacting a driven part, an end of the second member being inserted into the concave provided in the first side of the vibrating plate,
wherein a length of the first member along the second direction in the plan view is longer than a width of the second member along the second direction in the plan view, and
a width of the first member along the first direction in the plan view is shorter than a length of the second member along the first direction in the plan view.

12. The robot according to claim 11,
wherein the end of the second members is inserted into the concave that is provided at a center of the first side of the vibrating plate in the second direction.

13. The robot according to claim 11,
wherein the second member has at least two divided pieces provided apart in the second direction, and
the two divided pieces respectively contact the second member and the first side of the vibrating plate.

14. An electronic component conveyance apparatus comprising:
a base stage extending in a Y-axis direction;
a support member disposed next to the base state;
a Y-stage disposed at the support, the Y-stage extending from the support in an X-axis direction over the base stage, the Y-stage being movable along the Y-axis direction;
an X-stage disposed at the Y-stage, the X-stage being movable along the X-axis direction;
an electronic component holder disposed at the X-stage, the electronic component holder being movable in a Z-axis direction perpendicular to the X-axis direction and the Y-axis direction; and
the piezoelectric actuator according to claim 1,
wherein the piezoelectric actuator is disposed in an inside of the electronic component holder.

15. The electronic component conveyance apparatus according to claim 14,
wherein the end of the second member is inserted into the concave that is provided at a center of the first side of the vibrating plate in the second direction.

* * * * *